(12) United States Patent
Park et al.

(10) Patent No.: US 10,609,305 B2
(45) Date of Patent: Mar. 31, 2020

(54) ELECTRONIC APPARATUS AND OPERATING METHOD THEREOF

(71) Applicant: SAMSUNG ELECTRONICS CO., LTD., Suwon-si (KR)

(72) Inventors: Yonghoon Park, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/357,489

(22) Filed: Mar. 19, 2019

(65) Prior Publication Data

US 2019/0306435 A1 Oct. 3, 2019

(30) Foreign Application Priority Data

Apr. 3, 2018 (KR) .................. 10-2018-0038736

(51) Int. Cl.
*H04N 5/262* (2006.01)
*G06T 7/62* (2017.01)
(Continued)

(52) U.S. Cl.
CPC ............ *H04N 5/262* (2013.01); *G06F 3/147* (2013.01); *G06K 9/00664* (2013.01); *G06T 7/62* (2017.01);
(Continued)

(58) Field of Classification Search
CPC .... H04N 5/262; H04N 5/232939; H04N 5/44; H04N 5/4448; H04N 5/44513;
(Continued)

(56) References Cited

U.S. PATENT DOCUMENTS

2009/0296997 A1* 12/2009 Rocheford .............. G06F 21/32
382/124
2012/0013646 A1 1/2012 Ichioka et al.
(Continued)

FOREIGN PATENT DOCUMENTS

EP 3 306 568 A1 4/2018
KR 10-1315951 B1 10/2013
(Continued)

OTHER PUBLICATIONS

Communication dated Jul. 11, 2019, issued by the European Patent Office in counterpart European Patent Office in counterpart European Application No. 19159715.2.
(Continued)

*Primary Examiner* — Michael E Teitelbaum
(74) *Attorney, Agent, or Firm* — Sughrue Mion, PLLC

(57) ABSTRACT

Provided are electronic apparatuses and operating methods thereof. An electronic apparatus includes a camera, a display, a communication interface, a memory to store one or more instructions, and a processor configured to execute the one or more instructions to identify a plurality of punch holes for installation of a display apparatus from a captured image from the camera, provide a background image to be displayed on a screen of the display apparatus from the captured image by using an interval between actual punch holes for the installation of the display apparatus and an interval between the punch holes identified from the captured image, and control the communication interface to transmit the provided background image to the display apparatus.

20 Claims, 21 Drawing Sheets

(51) Int. Cl.
| | |
|---|---|
| H04N 5/232 | (2006.01) |
| G06K 9/00 | (2006.01) |
| H04N 5/44 | (2011.01) |
| G09G 3/20 | (2006.01) |
| G06F 3/147 | (2006.01) |
| H04N 5/445 | (2011.01) |
| H04N 21/485 | (2011.01) |
| G09G 5/00 | (2006.01) |
| G06F 3/0482 | (2013.01) |
| H04N 21/4223 | (2011.01) |
| H04N 21/41 | (2011.01) |

(52) U.S. Cl.
CPC ........... *G09G 3/2096* (2013.01); *G09G 5/006* (2013.01); *H04N 5/232939* (2018.08); *H04N 5/44* (2013.01); *H04N 5/4448* (2013.01); *H04N 5/44513* (2013.01); *H04N 21/4854* (2013.01); *G06F 3/0482* (2013.01); *G09G 2320/0606* (2013.01); *G09G 2320/08* (2013.01); *G09G 2354/00* (2013.01); *G09G 2360/14* (2013.01); *H04N 21/4126* (2013.01); *H04N 21/4223* (2013.01); *H04N 2005/44521* (2013.01)

(58) Field of Classification Search
CPC ........... H04N 21/4854; H04N 21/4126; H04N 21/4226; H04N 2005/44521; G06T 7/62; G06F 3/147; G06F 3/0482; G06K 9/00664; G09G 3/2096; G09G 5/006; G09G 2320/0606; G09G 2320/08; G09G 2354/00; G09G 2360/14

See application file for complete search history.

(56) References Cited

U.S. PATENT DOCUMENTS

| | | |
|---|---|---|
| 2012/0176544 A1 | 7/2012 | Shim |
| 2014/0307084 A1* | 10/2014 | Zontrop .................. G06T 11/00 348/121 |
| 2017/0068502 A1 | 3/2017 | Seo et al. |
| 2017/0131964 A1 | 5/2017 | Baek et al. |
| 2018/0048823 A1 | 2/2018 | Kang et al. |
| 2018/0350281 A1 | 12/2018 | Hur et al. |

FOREIGN PATENT DOCUMENTS

| | | |
|---|---|---|
| KR | 10-2017-0028810 A | 3/2017 |
| KR | 10-2017-0050995 A | 5/2017 |
| WO | 2017/078356 A1 | 5/2017 |
| WO | 2017/186303 A1 | 11/2017 |

OTHER PUBLICATIONS

Search Report and Written Opinion dated Jun. 21, 2019, issued by the International Searching Authority in International Application No. PCT/KR2019/002576 (PCT/ISA/210 and PCT/ISA/237).

* cited by examiner

FIG. 2
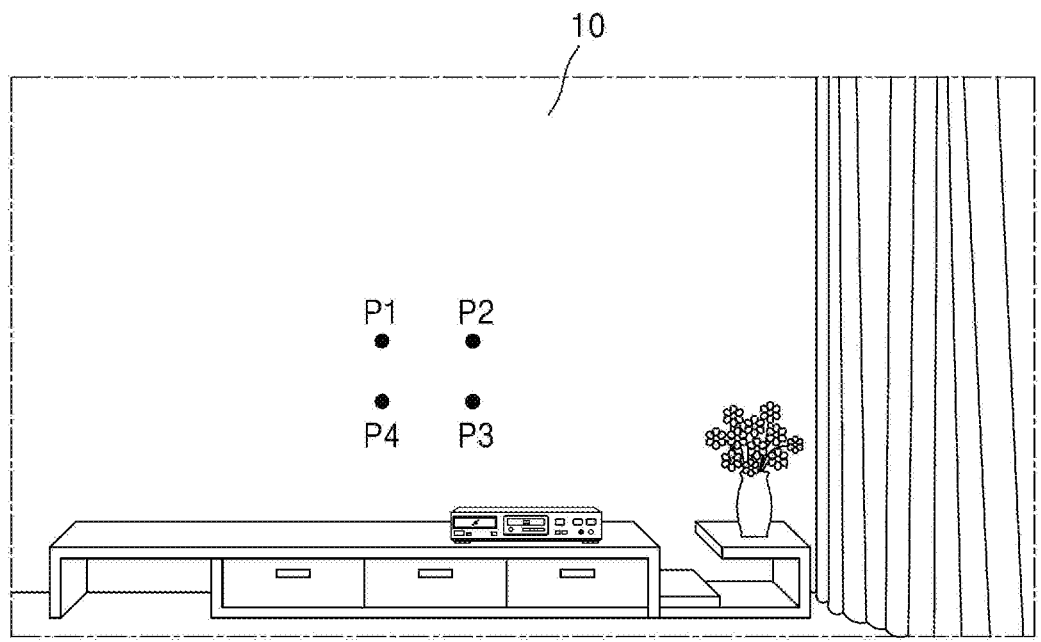
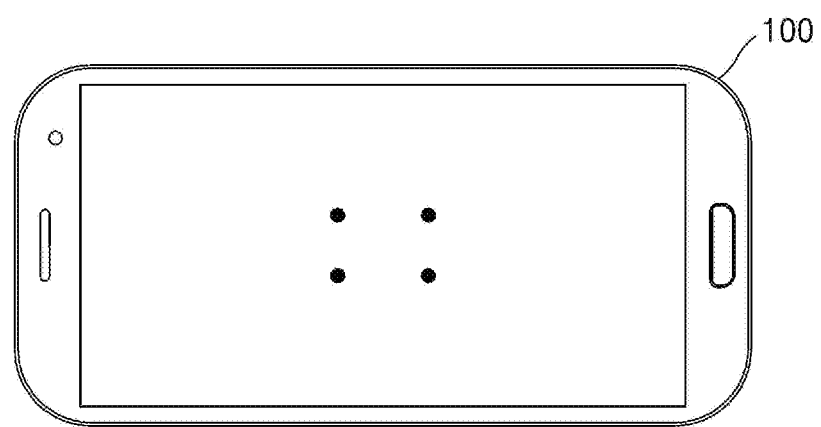

FIG. 11A
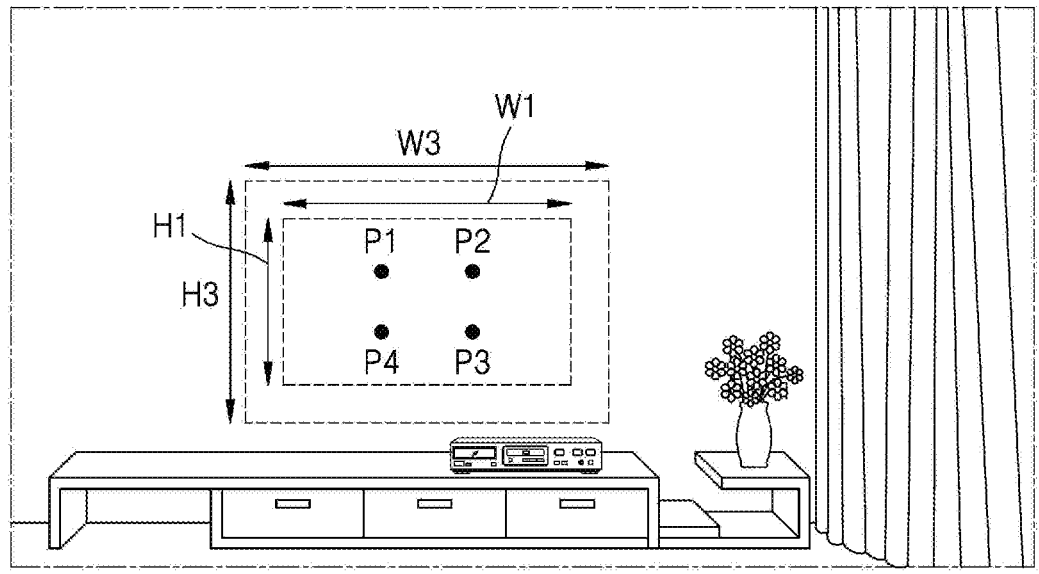
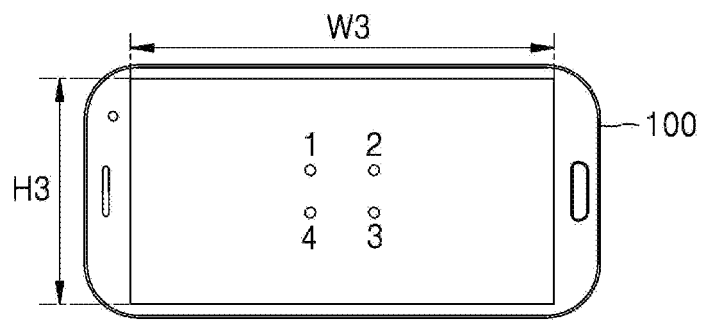

FIG. 11B
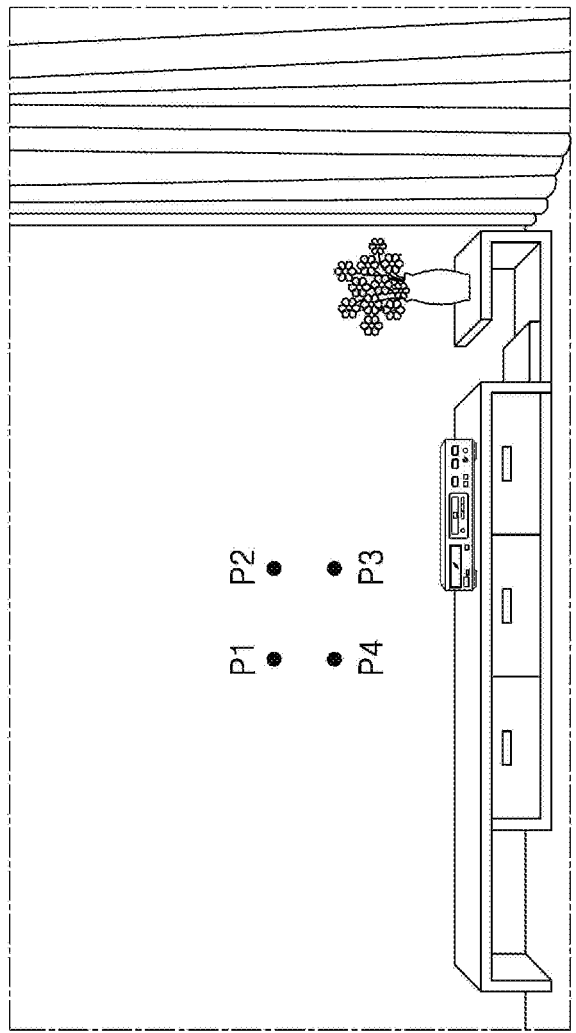
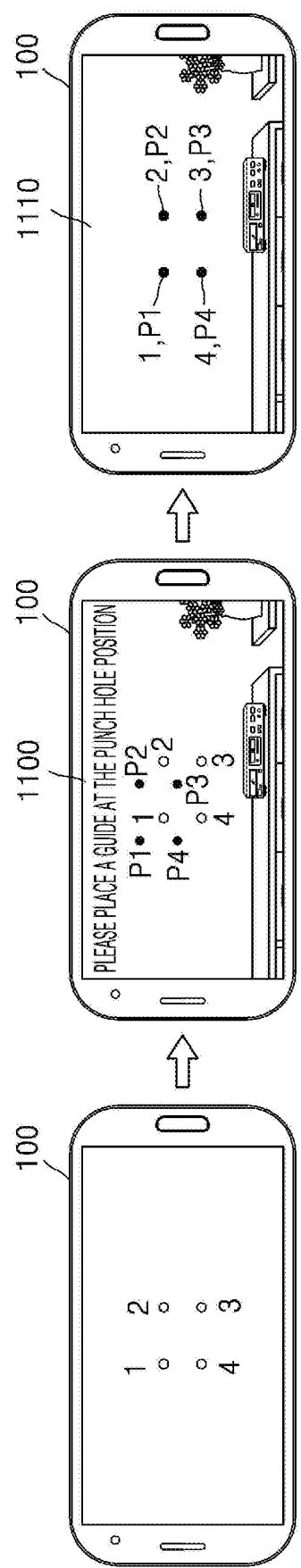

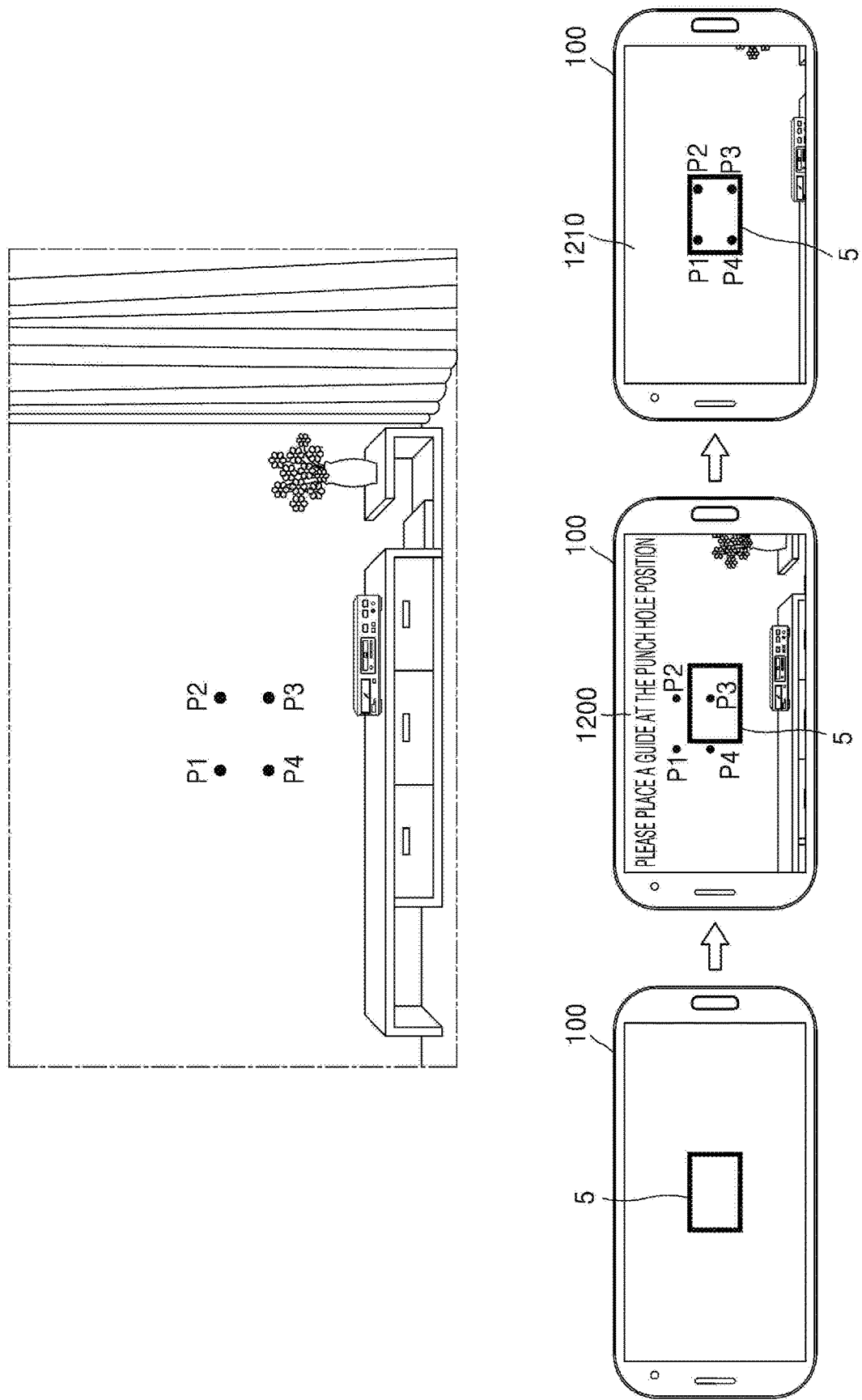

FIG. 16
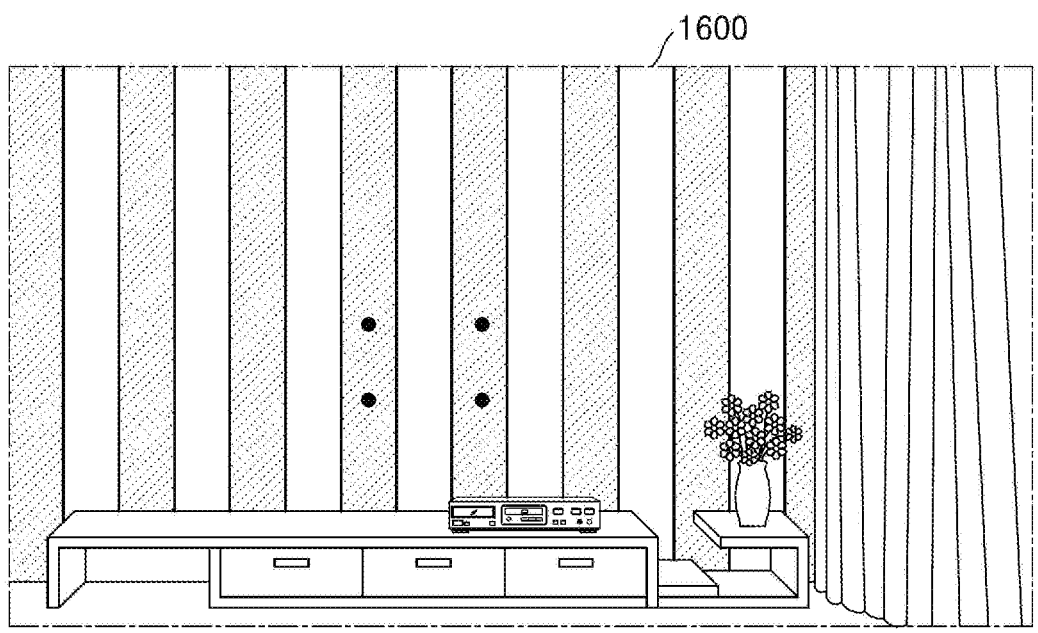
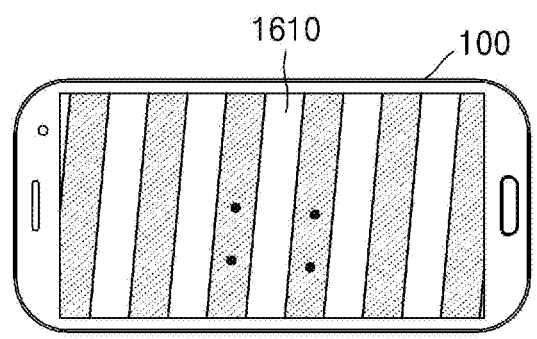

FIG. 17
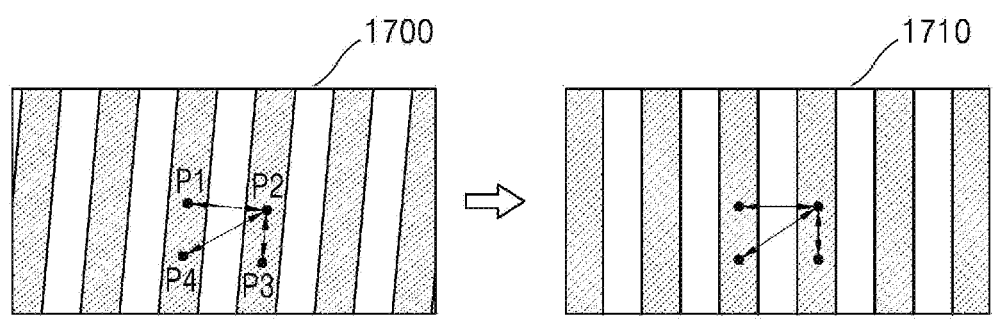
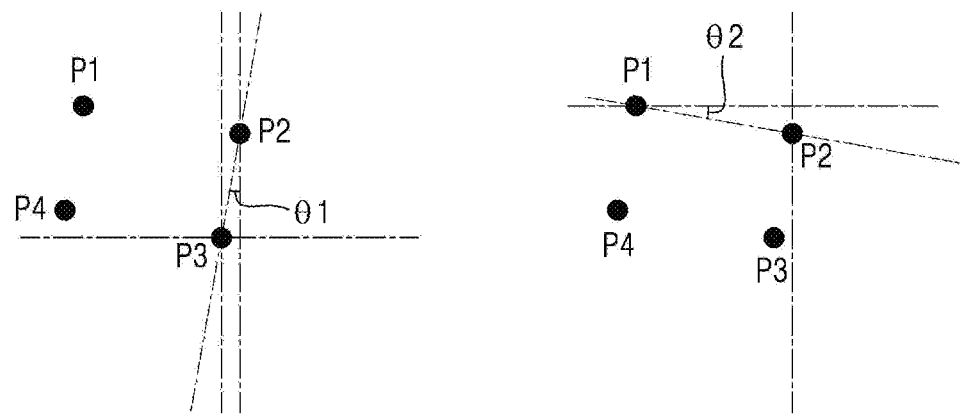

FIG. 18
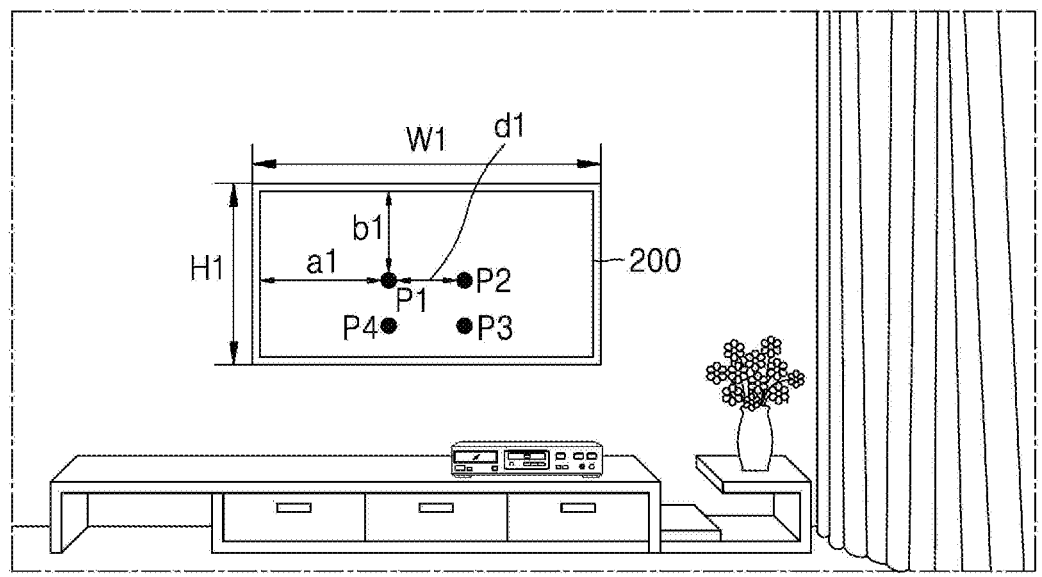
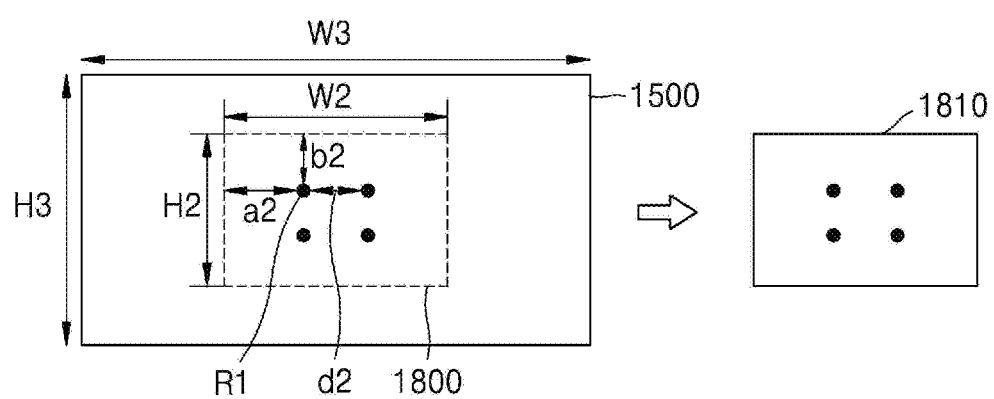

FIG. 20
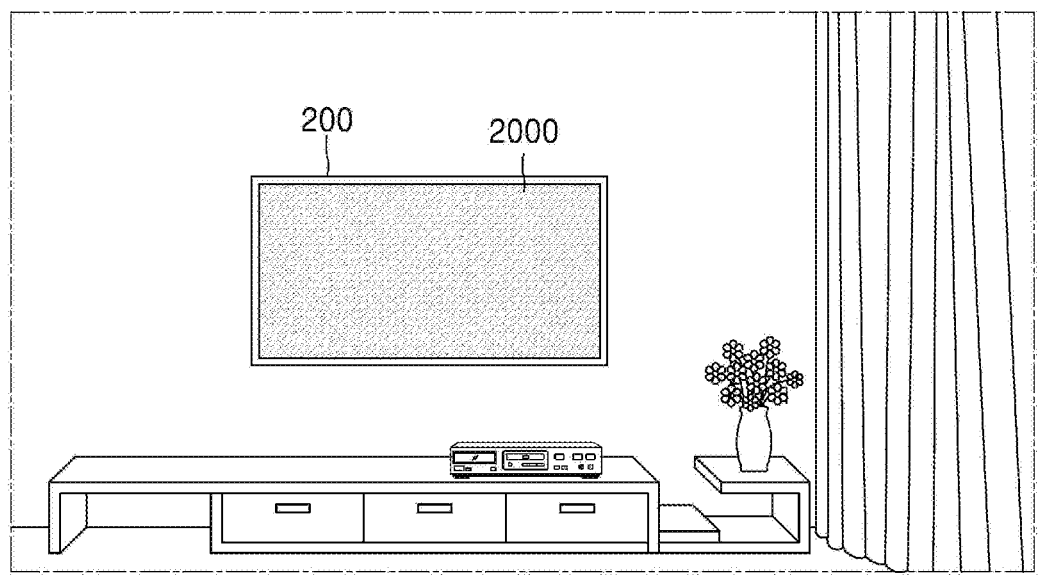
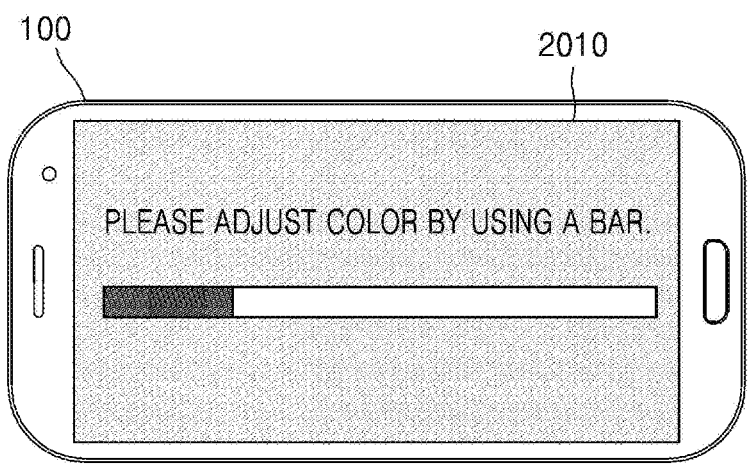

ELECTRONIC APPARATUS AND OPERATING METHOD THEREOF

CROSS-REFERENCE TO RELATED APPLICATION(S)

This application is based on and claims priority under 35 U.S.C. § 119 to Korean Patent Application No. 10-2018-0038736, filed on Apr. 3, 2018, in the Korean Intellectual Property Office, the disclosure of which is incorporated by reference herein in its entirety.

BACKGROUND

1. Field

The disclosure relates to electronic apparatuses and operating methods thereof, and more particularly, to electronic apparatuses which may enable a display apparatus to display an image of a wall surface, and operating methods thereof.

2. Description of Related Art

Image display apparatuses are equipped with a function to display an image for a user to view. The user may watch a broadcast through an image display apparatus. The image display apparatus displays, on a display, a broadcast selected by the user from among broadcast signals transmitted from a broadcasting station. Currently, broadcasting has globally shifted from analog broadcasting to digital broadcasting.

Digital broadcasting means broadcasting that transmits digital video and audio signals. Compared with analog broadcasting, digital broadcasting is robust against external noise and has small data loss, is advantageous in terms of error correction, has a high resolution, and provides a clear screen image. Furthermore, unlike analog broadcasting, the digital broadcasting is capable of providing bidirectional services.

In addition to the digital broadcasting function, a smart TV providing various types of content is provided. The smart TV aims at analyzing and providing what the user desires without the user's manipulation, rather than passively operating according to the user's selection.

Furthermore, in recent years, there have been products such as wall-mounted TVs, which are installed on a wall surface to enhance the interior aspect of the environment where the television is installed, and frame TVs for giving aesthetics like a picture frame.

SUMMARY

Provided are methods and apparatuses for displaying an image of a wall surface on a television screen to improve the aesthetics of an environment where the television is installed.

Additional aspects will be set forth in part in the description which follows and, in part, will be apparent from the description, or may be learned by practice of the presented embodiments of the disclosure.

According to an embodiment of the disclosure, an electronic apparatus includes a camera, a display, a communication interface, a memory to store one or more instructions, and a processor configured to execute the one or more instructions to identify a plurality of punch holes for installation of a display apparatus from a captured image from the camera, provide a background image to be displayed on a screen of the display apparatus from the captured image by using an interval between actual punch holes for the installation of the display apparatus and an interval between the punch holes identified from the captured image, and control the communication interface to transmit the provided background image to the display apparatus.

The processor may be further configured to execute the one or more instructions to provide the background image to be displayed on the screen of the display apparatus from the captured image by further using size information of the display apparatus obtained through the communication interface.

The processor may be further configured to execute the one or more instructions to obtain information about the interval between the actual punch holes from a user, and identify a size of the display apparatus based on the obtained information about the interval between the actual punch holes.

The memory may store mapping information obtained by mapping the information about the interval between the actual punch holes and the size information of the display apparatus, and the processor may be further configured to execute the one or more instructions to identify a size of the display apparatus corresponding to the information about the interval between the actual punch holes, to be the size of the display apparatus, by using the mapping information.

The processor may be further configured to execute the one or more instructions to control the display to display a guide image to identify an image, from which the background image is extracted, from the captured image obtained from the camera, and identify an image, in which the identified punch holes correspond to the guide image, from the captured image obtained from the camera to be the image from which the background image is extracted.

The processor may be further configured to execute the one or more instructions to identify at least one of a position or a size of the guide image by using the interval between the actual punch holes.

The processor may be further configured to execute the one or more instructions to identify the at least one of the position or the size of the guide image by further considering the size of the display apparatus.

The processor may be further configured to execute the one or more instructions to identify the plurality of punch holes from the captured image by automatically detecting the punch holes from the captured image or by displaying the captured image on the display and obtaining a user's input to select the punch holes from the captured image displayed on the display.

The processor may be further configured to execute the one or more instructions to obtain information about the interval between the actual punch holes by using a user's input or product information of the display apparatus.

The processor may be further configured to execute the one or more instructions to obtain information about an actual screen size of the display apparatus, identify a size of the background image corresponding to the actual screen size of the display apparatus based on a ratio between the interval between the actual punch holes and the interval between the identified punch holes, and provide the background image by obtaining an area corresponding to the identified size of the background image from the captured image.

The processor may be further configured to execute the one or more instructions to correct tilt distortion of the captured image by using coordinate values of the identified plurality of punch holes.

The processor may be further configured to execute the one or more instructions to remove a punch hole mark from the background image provided from the captured image.

The processor may be further configured to execute the one or more instructions to transmit the provided background image directly to the display apparatus, or to the display apparatus via a server.

According to another embodiment of the disclosure, a method of operating an electronic apparatus includes identifying a plurality of punch holes for installation of a display apparatus from a captured image obtained from a camera, providing a background image to be displayed on a screen of the display apparatus from the captured image by using an interval between actual punch holes for the installation of the display apparatus and an interval between the punch holes identified from the captured image, and controlling a communication interface to transmit the provided background image to the display apparatus.

The background image to be displayed on the screen of the display apparatus may be provided by further using size information of the display apparatus obtained through the communication interface of the electronic apparatus.

The method may further includes obtaining, from a user, information about the interval between the actual punch holes, and identifying a size of the display apparatus based on the obtained information about the interval between the actual punch holes.

The method may further include storing mapping information obtained by mapping the information about the interval between the actual punch holes and the size information of the display apparatus, and identifying the size of the display apparatus corresponding to the information about the interval between the actual punch holes, to be the size of the display apparatus, by using the mapping information.

The method may further include controlling a display of the electronic apparatus to display a guide image to identify an image, from which the background image is extracted, from the captured image obtained from the camera, and identifying an image, in which the identified punch holes correspond to the guide image, of the captured image obtained from the camera to be the image from which the background image is extracted.

The method may further include obtaining information about an actual screen size of the display apparatus, and identifying a size of the background image corresponding to the actual screen size of the display apparatus based on a ratio between the interval between the actual punch holes and the interval between the identified punch holes, and providing the background image by obtaining an area corresponding to the identified size of the background image from the captured image.

According to another embodiment of the disclosure, a non-transitory computer readable storage medium having stored thereon a program, which when executed by a computer, performs the method of operating an electronic apparatus which includes identifying a plurality of punch holes for installation of a display apparatus from a captured image obtained from a camera, providing a background image to be displayed on a screen of the display apparatus from the captured image by using an interval between actual punch holes for the installation of the display apparatus and an interval between the punch holes identified from the captured image, and controlling a communication interface to transmit a provided background image to the display apparatus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a reference view for describing a method of displaying a wall surface image on a display apparatus, according to an embodiment of the disclosure;

FIG. 11A illustrates an example of displaying a guide image such as a punch hole shape on a mobile apparatus, according to an embodiment of the disclosure;

FIG. 11B is a reference view for explaining an operation of capturing a wall surface image by using a guide image, according to an embodiment of the disclosure;

FIG. 12 illustrates an example of displaying a guide of a rectangular shape on a mobile apparatus, according to an embodiment of the disclosure;

FIG. 16 illustrates an example of an image having tilt distortion;

FIG. 17 illustrates an example of correcting an image having a tilt distortion, according to an embodiment of the disclosure;

FIG. 18 is a reference view for explaining an example of generating a background image by using a punch hole position identified from a captured image and an actual punch hole position, according to an embodiment of the disclosure;

FIG. 20 illustrates an example in which a user checks a background image displayed on a display apparatus and changes the color of the background image through a mobile apparatus, according to an embodiment of the disclosure.

DETAILED DESCRIPTION

Figure 1:
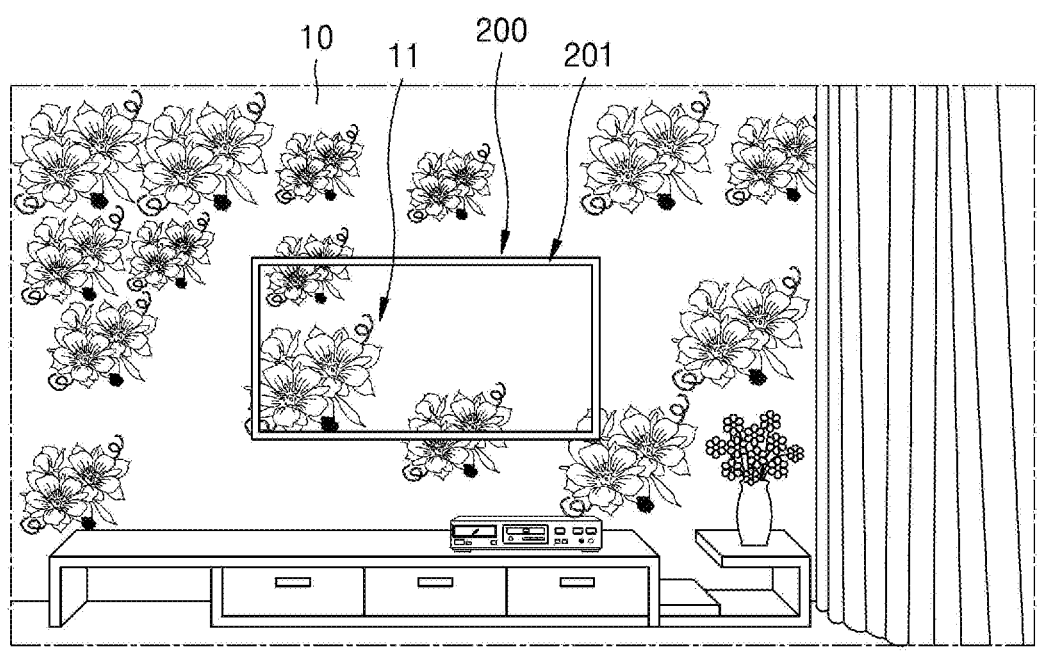
FIG. 1 is a reference view for describing a concept of displaying a wall surface image on a display apparatus, according to some embodiments of the disclosure.

Terms used in the present specification are briefly described, and then the disclosure is described in detail.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the content discussed throughout the specification, not by their simple meanings.

When a part may "include" a certain constituent element, unless specified otherwise, it may not be construed to exclude another constituent element but may be construed to further include other constituent elements. Furthermore, terms such as "~portion", "~module", etc. stated in the specification may signify a unit to process at least one function or operation and the unit may be embodied by hardware, software, or a combination of hardware and software.

Embodiments of the disclosure are provided to further completely explain the disclosure to one of ordinary skill in the art to which the disclosure pertains. However, the disclosure is not limited thereto and it will be understood that various changes in form and details may be made therein without departing from the spirit and scope of the following claims. In the drawings, a part that is not related to a description is omitted to clearly describe the disclosure and, throughout the specification, similar parts are referenced with similar reference numerals.

As used herein, the term "user" may refer to a person controlling the function or operation of an image display apparatus by using a control apparatus, and may include a viewer, a manager or an installation technician.

FIG. 1 is a reference view for explaining a concept of displaying a wall surface image on a display apparatus, according to some embodiments of the disclosure.

Referring to FIG. 1, a display apparatus 200 is installed on a wall surface 10. The display apparatus 200 according to an embodiment of the disclosure may display an image 11 of a part of the wall surface 10, in a state other than a general operation mode of the display apparatus 200 for displaying content according to a user's input. When a user does not operate and use the display apparatus 200, the display apparatus 200 displays the image 11 of a part of the wall surface 10 to improve the aesthetics of an environment where the display apparatus 200 is installed. Furthermore, by further slimming a bezel 201 of the display apparatus 200 or implementing bezel 201 in a color that is not identifiable to the human eyes, the user may be provided with experience as if the display apparatus 200 does not exist on the wall surface 10 while the display apparatus 200 is not operated. A TV that provides such an effect may be referred to as a Glass TV.

As such, when the display apparatus 200 displays an image of a wall surface 11, a user may experience more as if the display apparatus 200 is a real wall surface as the actual wall surface 10 and the image of a wall surface 11 displayed on the display apparatus 200 are more naturally connected. Even after the display apparatus 200 is installed on the wall surface 10, it is possible to generate a background image to be displayed on the display apparatus 200 by using an image of a surrounding area of the display apparatus 200. However, for generation of a more accurate and smoother background image, an image of a wall surface to be covered by the display apparatus 200 may be obtained before the display apparatus 200 is installed on the wall surface 10, and a background image may be generated by using the obtained image. In particular, as illustrated in FIG. 1, in a state in which a wall surface has an irregular pattern, not a regular pattern, when the image of a surrounding area of the display apparatus 200 is used as a background image after the display apparatus 200 is installed, the pattern may not be smoothly connected. Accordingly, generating a background image by using an image of an area to be covered by the display apparatus 200 before the display apparatus 200 is installed may be necessary.

FIG. 2 is a reference view for describing a method of displaying a wall surface image on a display apparatus, according to an embodiment of the disclosure.

Referring to FIG. 2, a plurality of punch hole positions P1, P2, P3, and P4 for installation of the display apparatus 200 may be marked on the wall surface 10. As punch holes are actually formed on the wall surface 10 for the installation of the display apparatus 200, the punch hole positions P1, P2, P3, and P4 may be seen. Alternatively, the punch hole positions P1, P2, P3, and P4 may be seen by marking, on the wall surface 10, the punch hole positions for the installation of the display apparatus 200 by using a pen. Although FIG. 2 illustrates four punch hole positions, the disclosure is not limited thereto and two punch hole positions suffice.

A mobile apparatus 100 may capture an image of a wall surface including the punch hole positions P1, P2, P3, and P4, and generate a background image to be displayed on the display apparatus 200 by using punch holes identified in the captured image and the size information of the display apparatus 200.

The mobile apparatus 100 may display one or more guide images on a display of the mobile apparatus 100. The mobile apparatus 100 may capture an image of the wall surface 10 by using a plurality of punch holes displayed in one or more guide images and the wall surface 10. For example, when a user moves the mobile apparatus 100 so that the guide image of the mobile apparatus 100 is located on the punch holes marked on the wall surface 10, the mobile apparatus 100 may capture an image of a wall surface.

Figure 3:
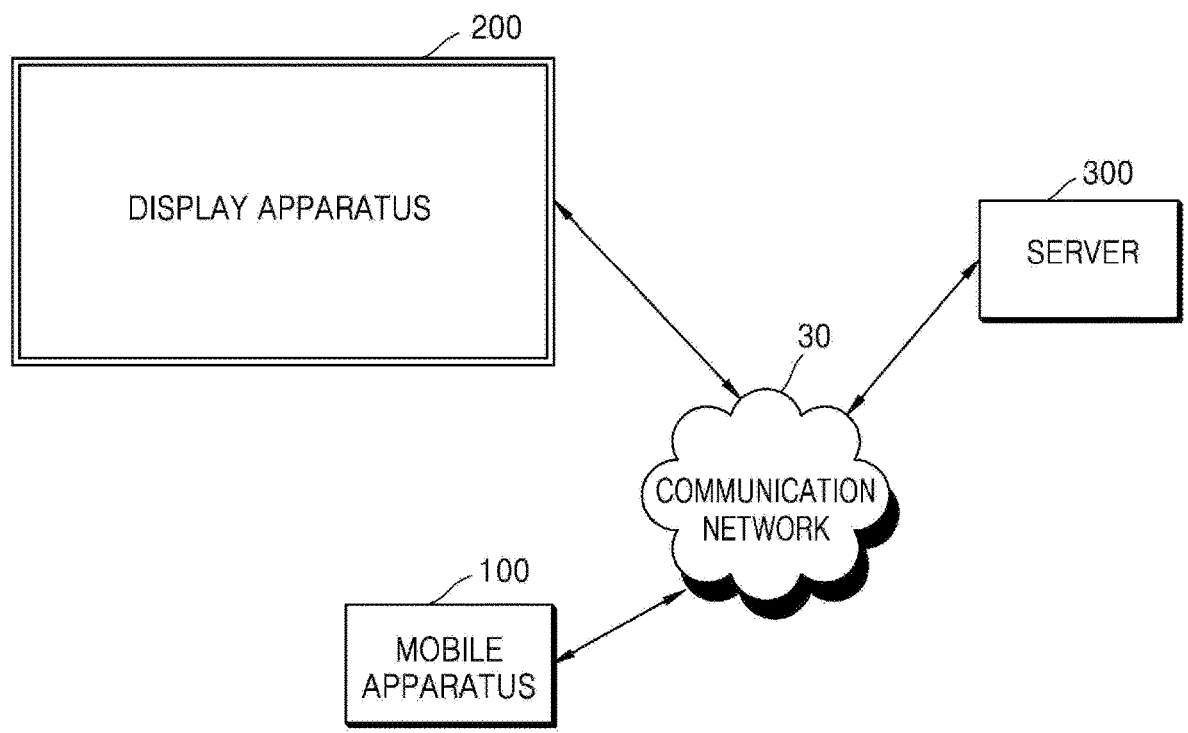
FIG. 3 is a schematic view of an example of a system for displaying an image of a wall surface on a display apparatus, according to some embodiments of the disclosure.

FIG. 3 is a schematic view of an example of a system for displaying an image of a wall surface on a display apparatus, according to some embodiments of the disclosure.

Referring to FIG. 3, a system according to an embodiment of the disclosure may include the mobile apparatus 100, the display apparatus 200, and a server 300. The mobile apparatus 100, the display apparatus 200, and the server 300 may communicate with one another through a communication network 30. The communication network 30 may include a broadband network according to various communication specifications such as Zigbee, 3rd Generation (3G), 3rd Generation Partnership Project (3GPP), or Long Term Evolution (LTE).

The mobile apparatus 100 may receive information about the display apparatus 200, e.g., screen size information, from the display apparatus 200 or the server 300, through the server 300.

The mobile apparatus 100 may capture an image of a wall surface on which the punch hole positions for the installation of the display apparatus 200 are marked or in which the punch holes for the installation of the display apparatus 200 are formed, and obtain an area of the background image to be displayed on the display apparatus by using the size information of the display apparatus to be installed on the wall surface and the punch hole positions in the captured image, thereby generating a background image. The mobile apparatus 100 may transmit the generated background image to the display apparatus 200 via the server 300.

When receiving the background image via the server 300, the display apparatus 200 may display the received background image on a screen.

Figure 4:
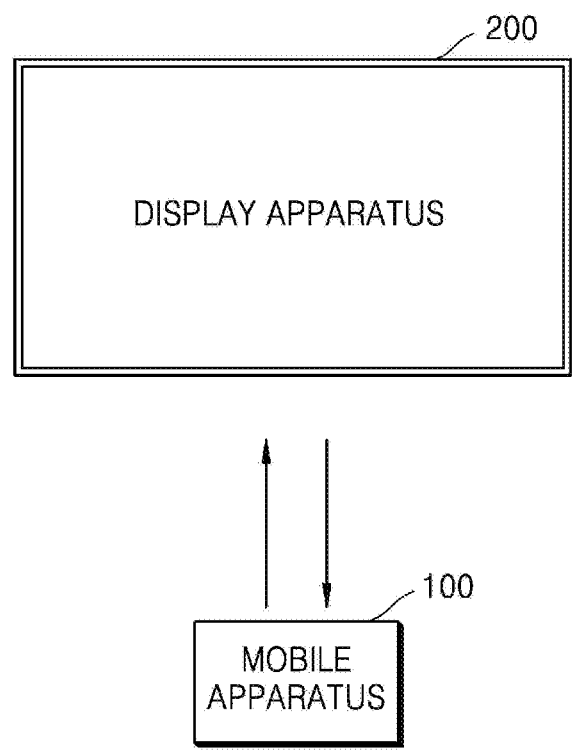
FIG. 4 is a schematic view of another example of a system for displaying an image of a wall surface on a display apparatus, according to some embodiments of the disclosure.

FIG. 4 is a schematic view of another example of a system for displaying an image of a wall surface on a display apparatus, according to some embodiments of the disclosure.

Referring to FIG. 4, the system according to an embodiment of the disclosure may include the mobile apparatus 100 and the display apparatus 200. The mobile apparatus 100 and the display apparatus 200 may communicate with each other through a short-range communication method. The short-range communication method may use short-range communication protocols such as Bluetooth, Bluetooth low energy (BLE), WiFi, WiFi direct, near field communication (NFC), an infrared communication, and a laser beam communication.

Because data communication is not performed through the server 300, the mobile apparatus 100 may receive the screen information of the display apparatus 200 directly from the display apparatus 200.

The mobile apparatus 100 may capture a wall surface image including punch holes, obtain the area of the background image to be displayed on the display apparatus 200 from the captured image by using the size information of a display apparatus to be installed on the wall surface and the punch hole positions in the captured image, and generate a background image. The mobile apparatus 100 may transmit the generated background image to the display apparatus 200 by using a short-range communication method.

The display apparatus 200 may receive a background image from the mobile apparatus 100 and display the received background image on the screen.

Figure 5:
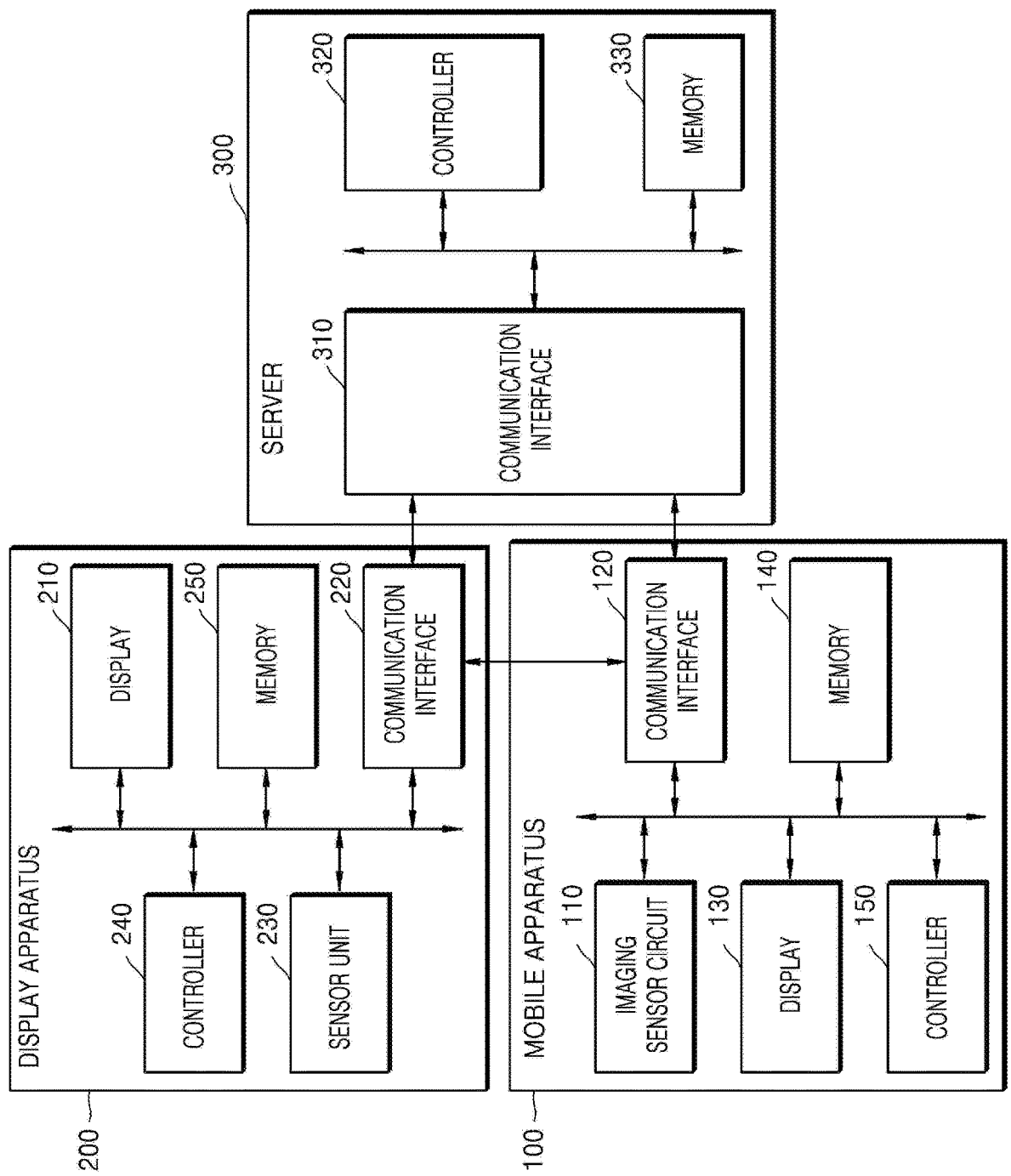
FIG. 5 is a block diagram of a mobile apparatus, a display apparatus, and a server, according to an embodiment of the disclosure.

FIG. 5 is a block diagram of the mobile apparatus 100, the display apparatus 200, and the server 300, according to an embodiment of the disclosure.

The display apparatus 200 may process content data received through various sources and display an image. The display apparatus 200 may receive RF signals from a broadcasting station by using an RF antenna. The display apparatus 200 may receive content provided by a content providing server through a communication network based on the Internet protocol. The display apparatus 200 may receive content from an external apparatus connected to the display apparatus 200 through various ports or an HDMI port. The external apparatus may include, for example, a set-top box, a gaming apparatus, a BD player, PC, or USB. In addition, the display apparatus 200 may receive content from a mobile apparatus that is connected for communication, or obtain data content from a built-in memory or a locally connected memory.

The display apparatus 200 may include a display 210, a communication interface 220, a sensor unit 230, and a controller 240.

The display 210 displays the content received through various sources under the control of the controller 240. The various sources may include, for example, the communication interface 220, a memory 250, and an input/output unit. The display 210 may be implemented by a PDP, an LCD, an OLED, or a flexible display. Furthermore, the display 210 may be implemented by a 3D display. Furthermore, the display 210 may include a touch screen, and thus may be used as an input device in addition to an output device.

The communication interface 220, under the control of the controller 240, may connect the display apparatus 200 to an external apparatus, for example, the mobile apparatus 100 or the server 300. The communication interface 220 may include one of wireless LAN, Bluetooth, and wired Ethernet or a combination thereof corresponding to the performance and structure of the display apparatus 200. The communication interface 220 may further include a short-range communication other than Bluetooth, for example, NFC or BLE.

The sensor unit 230 detects user's voice, user's image, or user's interaction, and may include a microphone for receiving voice uttered by a user, a camera portion for receiving an image corresponding to a user's motion including gestures within an identifiable range of a camera, and a light receiving portion for receiving an optical signal including a control signal received from an external remote control apparatus according to a user's input. The sensor unit 230 may detect a command or a control signal from the remote control apparatus through the light receiving portion, and transmit the detected command or control signal to the controller 240. The remote control apparatus may be implemented in various types of apparatuses for controlling the display apparatus 200, such as, a remote controller or a mobile phone.

The memory 250, under the control of the controller 240, may store various pieces of data, programs, or applications for operating and controlling the display apparatus 200. The memory 250 may store an operating system for controlling the display apparatus 200 and the controller 240, an application originally provided by a manufacturer or externally downloaded, a graphical user interface (GUI) related to the application, an object, for example, an image, text, an icon, or a button, for providing the GUI, user information, documents, databases, or related data.

The memory 250 may include a ROM, a RAM, or a memory card, for example, a micro SD card or a USB memory, installed in the display apparatus 200, which is not shown. Furthermore, the memory 200 may include a non-volatile memory, a volatile memory, a hard disk drive (HDD), or a solid state drive (SSD).

In particular, the memory 250 according to an embodiment of the disclosure may store one or more instructions to transmit information about the display apparatus 200, at the request of the mobile apparatus 100 or the server 300. The information about the display apparatus 200 may include the size information, e.g., screen size information, of the display apparatus 200.

The memory 250 according to an embodiment of the disclosure may store one or more instructions to receive a background image from the mobile apparatus 100 or the server 300 and display the received background image on the display. The background image may include an image generated by capturing an image of a wall surface including the punch holes for the installation of the display apparatus 200 and using the captured image.

The controller 240 performs a function to control an overall operation of the display apparatus 200 and a flow of signals between internal constituent elements of the display apparatus 200, and to process data. When a user's input exists or a preset and stored condition is met, the controller 240 may execute an operation system (OS) and various applications stored in the memory 250.

A processor used in the controller 240 may include a graphic processing unit (GPU; not shown) for processing graphics corresponding to a video. The processor may be implemented by a system on chip (SoC) incorporating a core (not shown) and a GPU. The processor may include a single core, a dual core, a triple core, a quad core, or a core of a multiple number thereof.

Furthermore, the processor may include a plurality of processors. For example, the processor may be implemented by a main processor (not shown) and a sub-processor (not shown) operating in a sleep mode.

The controller 240 according to an embodiment of the disclosure may transmit information about the display apparatus 200 upon the request of the mobile apparatus 100 or the server 300, by executing the one or more instructions stored in the memory 250.

The controller 240 according to an embodiment of the disclosure may receive a background image from the mobile apparatus 100 or the server 300, and display the received background image on the display, by executing the one or more instructions stored in the memory 250. The background image may include an image generated by capturing and using an image of a wall surface including the punch holes for the installation of the display apparatus 200.

The display apparatus 200 may further include the input/output unit that receives a video, for example, a moving picture, audio, for example, voice or music, and additional information, for example, EPG, from the outside of the display apparatus 200, under the control of the controller 240. The input/output unit may include one of a high-definition multimedia interface (HDMI) port, a component jack, a PC port, and a USB port, or a combination thereof. The display apparatus 200 according to an embodiment of the disclosure may be a TV, but it may be a mere embodiment of the disclosure, and may be implemented by an electronic apparatus including a display. For example, the display apparatus 200 may be implemented by various electronic apparatuses such as desktops computers or digital broadcast terminals. The display apparatus 200 may be implemented not only by a flat display apparatus, but also by a curved display apparatus having a curvature or a flexible display apparatus having an adjustable curvature.

Furthermore, the display apparatus 200 may be electrically connected to a separate external apparatus having a tuner portion, for example, a set-top box (not shown). For example, the display apparatus 200 may be implemented by an analog TV, a digital TV, a 3D-TV, a smart TV, an LED TV, an OLED TV, a plasma TV, or a monitor, and one of ordinary skill in the art can easily understand that the disclosure is not limited thereto.

The block diagram of the display apparatus 200 is a block diagram for an embodiment of the disclosure. Each of constituent elements in the block diagram may be incorporated, added, or omitted according to the specification of the display apparatus 200 that is actually implemented. In other words, as necessary, two or more constituent elements may be incorporated in a single constituent element, or one constituent element may be divided into two or more constituent elements. Furthermore, a function performed by each block is to describe embodiments of the disclosure, and a detailed operation or apparatus does not limit the right scope of the disclosure.

The server 300 is a computing apparatus for executing a server program that provides a service at the request of a user (client).

The server 300 may include a communication interface 310, a controller 320, and a memory 330.

The communication interface 310, under the control of the controller 320, may connect the server 300 to an external apparatus, for example, the mobile apparatus 100 or the display apparatus 200. The communication interface 220 may include one of wireless LAN, Bluetooth, and wired Ethernet, or a combination thereof, corresponding to the performance and structure of the display apparatus 200.

The memory 330, under the control of the controller 320, may store various pieces of data, programs, or applications to drive and control the server 300. The memory 330 may store an operating system for controlling the server 300 and the controller 320, an application originally provided by a manufacturer or externally downloaded, a GUI related to the application, an object, for example, image text, an icon, or a button, for providing the GUI, user information, documents, databases, or related data.

The memory 330 may include a ROM, a RAM, or a memory card, for example, a micro SD card or a USB memory, installed in the server 300, which is not shown. Furthermore, the memory 330 may include a non-volatile memory, a volatile memory, an HDD, or an SSD.

In particular, the memory 330 according to an embodiment of the disclosure may store one or more instructions to transmit an application to control one or more devices in the home, at the request of the mobile apparatus 100. The device control application may be used to control the display apparatus 200, in particular, may include one or more instructions to set a background image of the display apparatus 200.

The memory 330 according to an embodiment of the disclosure may store one or more instructions to transmit information about the display apparatus 200, at the request of the mobile apparatus 100. The information about the display apparatus 200 may include the size information, e.g., screen size information, of the display apparatus 200.

The memory 330 according to an embodiment of the disclosure may store one or more instructions to receive a background image from the mobile apparatus 100 and transmit the background image to the display apparatus 200. The background image may include an image generated by capturing and using an image of a wall surface including the punch hole positions for the installation of the display apparatus 200.

The controller 320 performs a function to control an overall operation of the server 300 and a flow of signals between the internal constituent elements of the server 300, and to process data. When a user's input exists or a preset and stored condition is met, the controller 320 may execute an OS and various applications stored in the memory 330.

A processor used in the controller 320 may include a GPU (not shown) for processing graphics corresponding to a video. The processor may be implemented by a SoC incorporating a core (not shown) and a GPU. The processor may include a single core, a dual core, a triple core, a quad core, or a core of a multiple number thereof.

Furthermore, the processor may include a plurality of processors. For example, the processor may be implemented by a main processor (not shown) and a sub-processor (not shown) operating in a sleep mode.

The controller 320 according to an embodiment of the disclosure, at the request of the mobile apparatus 100, may transmit an application to control one or more devices in the home to the mobile apparatus 100 by executing the one or more instructions stored in the memory 330. The device control application may be used to control the display apparatus 200, and may include one or more instructions to set a background image of the display apparatus 200.

The controller 320 according to an embodiment of the disclosure, at the request of the mobile apparatus 100, may transmit the information about the display apparatus 200 by executing the one or more instructions stored in the memory 330. The information about the display apparatus 200 may include the size information, e.g., screen size information, of the display apparatus 200.

The controller 320 according to an embodiment of the disclosure may receive a background image from the mobile apparatus 100 and transmit the background image to the display apparatus 200, by executing the one or more instructions stored in the memory 330. The background image may include an image generated by capturing and using an image of a wall surface including the punch holes for the installation of the display apparatus 200.

The mobile apparatus 100 may capture an image of a wall surface on which the display apparatus 200 is to be installed, generate a background image to be displayed on the screen of the display apparatus 200 based on the captured image, and transmit the background to the display apparatus 200 via the server 300.

The mobile apparatus 100 may include an imaging sensor circuit 110, a communication interface 120, a display 130, a memory 140, and a controller 150.

The imaging sensor circuit 110 may receive an image, for example, continuous frames, corresponding to a user's motion including gestures in an identifiable range of an imaging sensor. The imaging sensor circuit 110 may be implemented by a camera. The imaging sensor circuit 110 according to an embodiment of the disclosure may capture an image showing a wall surface to be displayed by the display apparatus 200.

The communication interface 120, under the control of the controller 150, may connect the mobile apparatus 100 to an external apparatus, for example, the display apparatus 200 or the server 300. The communication interface 120 may include one of wireless LAN, Bluetooth, and wired Ethernet, or a combination thereof, corresponding to the performance and structure of the mobile apparatus 100. The communication interface 120 may include a mobile communication portion and a sub-communication portion.

The mobile communication portion may perform a broadband network communication according to various communication specifications such as Zigbee, 3G, 3GPP, or LTE. The mobile communication portion may be used for communication with the server 300.

The sub-communication portion may perform communication with peripheral devices by using a short-range communication protocol such as Bluetooth, BLE, WiFi, NFC, an infrared communication, or a laser beam communication. The sub-communication portion may be used for communication with the display apparatus 200.

The display 130, under the control of the controller 150, displays content received through various sources on the screen. The various sources may include, for example, the communication interface 120, the memory 140, and the input/output unit. Furthermore, the display 130 may include a touch screen, and thus may be used as an input device in addition to an output device.

The memory 140, under the control of the controller 150, may store various pieces of data, programs, or applications to drive and control the mobile apparatus 100. The memory 140 may store an operating system for controlling the mobile apparatus 100 and the controller 150, an application originally provided by a manufacturer or externally downloaded, a GUI related to the application, an object, for example, image text, an icon, or a button, for providing the GUI, user information, documents, databases, or related data.

The memory 140 may include a ROM, a RAM, or a memory card, for example, a micro SD card or a USB memory, installed in the mobile apparatus 100, which is not shown.

In particular, the memory 140 according to an embodiment of the disclosure may store one or more instructions to transmit a download request of an application to control an external device to the server 300, and accordingly, to receive and store a device control application. The device control application may include one or more instructions to control the display apparatus 200, e.g., one or more instructions used to set a background image of the display apparatus 200.

The memory 140 according to an embodiment of the disclosure may store one or more instructions to receive the information about the display apparatus 200 from the mobile apparatus 100 or the server 300. The information about the display apparatus 200 may include the size information, e.g., screen size information, of the display apparatus 200.

The memory 140 according to an embodiment of the disclosure may store one or more instructions to control the communication interface 120 to identify a plurality of punch holes for the installation of the display apparatus 200 from the image captured by the camera, generate a background image to be displayed on the screen of the display apparatus 200 from the captured image by using an interval between actual punch holes for the installation of the display apparatus 200 and an interval between the punch holes identified in the captured image, and transmit the generated background image to the display apparatus 200.

The memory 140 according to an embodiment of the disclosure may store one or more instructions to generate a background image to be displayed on the screen of the display apparatus 200 from the captured image, by further using the size information of the display apparatus 200 received through the communication interface 120.

The memory 140 according to an embodiment of the disclosure may store one or more instructions to receive information about the interval between a plurality of actual punch holes from a user, and determine the size of the display apparatus 200 based on the received information about the interval between the actual punch holes.

The memory 140 according to an embodiment of the disclosure may store one or more instructions to store mapping information about mapping of the information about the interval between the actual punch holes and the size information of the display apparatus 200, and determine the size of the display apparatus 200 corresponding to the information about the interval between the actual punch holes to be the size of the display apparatus 200 by using the mapping information.

The memory 140 according to an embodiment of the disclosure may store one or more instructions to control the display to display a guide image and determine an image, in which the identified punch holes correspond to the guide image, of the captured image received from the camera to be an image from which the background image is extracted.

The memory 140 according to an embodiment of the disclosure may store one or more instructions to determine at least one of the position and size of the guide image by using the interval between the actual punch holes.

The memory 140 according to an embodiment of the disclosure may store one or more instructions to determine at least one of the position and size of the guide image by further considering the size of the display apparatus 200.

The memory 140 according to an embodiment of the disclosure may store one or more instructions to identify punch holes from the captured image by automatically detecting the punch holes from the captured image or receiving a user input to display the captured image on the display and select the punch holes from the image displayed on the display.

The memory 140 according to an embodiment of the disclosure may store one or more instructions to obtain information about the interval between the actual punch holes by a user's input or using production information of the display apparatus 200.

The memory 140 according to an embodiment of the disclosure may store one or more instructions to generate a background image by obtaining information about an actual screen size of the display apparatus 200, determine the size of the background image corresponding to the actual screen size of the display apparatus 200 based on a ratio between the interval between the actual punch holes and the interval between the identified punch holes, and obtain an area corresponding to the determined size of the background image from the captured image.

The memory 140 according to an embodiment of the disclosure may store one or more instructions to correct tilt distortion of the captured image by using coordinate values of the identified punch holes.

The memory 140 according to an embodiment of the disclosure may store one or more instructions to remove the marks of punch holes from the background image generated from the captured image.

The memory 140 according to an embodiment of the disclosure may store one or more instructions to transmit the generated background image directly to the display apparatus 200 or via the server 300.

The controller 150 performs a function to control an overall operation of the mobile apparatus 100 and a flow of signals between internal constituent elements of the mobile apparatus 100, and to process data. When a user's input exists or a preset and stored condition is met, the controller 150 may execute an OS and various applications stored in the memory 140.

A processor used in the controller 150 may include a GPU (not shown) for processing graphics corresponding to a video. The processor may be implemented by a SoC incorporating a core (not shown) and a GPU. The processor may include a single core, a dual core, a triple core, a quad core, or a core of a multiple number thereof.

Furthermore, the processor may include a plurality of processors. For example, the processor may be implemented by a main processor (not shown) and a sub-processor (not shown) operating in a sleep mode.

The controller 150 according to an embodiment of the disclosure may transmit a download request of an application to control an external device to the server 300, and accordingly, to receive and store a device control application, by executing the one or more instructions stored in the memory 140. The device control application may include one or more instructions to control the display apparatus 200, e.g., one or more instructions used to set a background image of the display apparatus 200.

The controller 150 according to an embodiment of the disclosure may receive the information about the display apparatus 200 from the mobile apparatus 100 or the server 300, by executing the one or more instructions stored in the memory 140. The information about the display apparatus 200 may include the size information, e.g., screen size information, of the display apparatus 200.

The controller 150 according to an embodiment of the disclosure, by executing the one or more instructions stored in the memory 140, may control the communication interface 120 to identify a plurality of punch holes for the installation of the display apparatus 200 from the image captured by the camera, generate a background image to be displayed on the screen of the display apparatus 200 from the captured image by using the interval between the actual punch holes for the installation of the display apparatus 200 and an interval between the punch holes identified in the captured image, and transmit the generated background image to the display apparatus 200.

The controller 150 according to an embodiment of the disclosure, by executing the one or more instructions stored in the memory 140, may generate a background image to be displayed on the screen of the display apparatus 200 from the captured image, by further using the size information of the display apparatus 200 received through the communication interface 120.

The controller 150 according to an embodiment of the disclosure, by executing the one or more instructions stored in the memory 140, may receive, from the user, the information about the interval between the actual punch holes, and determine the size of the display apparatus 200 based on the received information about the interval between the actual punch holes.

The memory 140 according to an embodiment of the disclosure may store mapping information about mapping of the information about the interval between the actual punch holes and the size information of the display apparatus 200, and determine the size of the display apparatus 200 corresponding to the information about the interval between the actual punch holes to be the size of the display apparatus 200 by using the mapping information.

The controller 150 according to an embodiment of the disclosure, by executing the one or more instructions stored in the memory 140, may control the display to display a guide image and determine an image, in which the identified punch holes correspond to the guide image, of the captured image received from the camera to be an image from which the background image is extracted.

The controller 150 according to an embodiment of the disclosure, by executing the one or more instructions stored in the memory 140, may determine at least one of the position and size of the guide image by using the interval between the actual punch holes.

The controller 150 according to an embodiment of the disclosure, by executing the one or more instructions stored in the memory 140, may determine at least one of the position and size of the guide image by further considering the size of the display apparatus 200.

The controller 150 according to an embodiment of the disclosure may identify punch holes from the captured image by automatically detecting the punch holes from the captured image or receiving a user input to display the captured image on the display and select the punch holes from the image displayed on the display.

The controller 150 according to an embodiment of the disclosure, by executing the one or more instructions stored in the memory 140, may obtain the information about the interval between the actual punch holes by using the user's input or product information of the display apparatus 200.

The controller 150 according to an embodiment of the disclosure, by executing the one or more instructions stored in the memory 140, may obtain information about an actual screen size of the display apparatus 200, determine the size of the background image corresponding to the actual screen size of the display apparatus 200 based on a ratio between the interval between the actual punch holes and the interval between the identified punch holes, and obtain an area corresponding to the determined size of the background image from the captured image.

The controller 150 according to an embodiment of the disclosure, by executing the one or more instructions stored in the memory 140, may correct tilt distortion of the captured image by using coordinate values of the identified punch holes.

The controller 150 according to an embodiment of the disclosure, by executing the one or more instructions stored in the memory 140, may remove the marks of punch holes from the background image generated from the captured image.

The controller 150 according to an embodiment of the disclosure, by executing the one or more instructions stored in the memory 140, may transmit the generated background image directly to the display apparatus 200 or via the server 300.

The block diagram of the mobile apparatus 100 is a block diagram for an embodiment of the disclosure. Each of constituent elements in the block diagram may be incorporated, added, or omitted according to the specification of the mobile apparatus 100 that is actually implemented. In other words, as necessary, two or more constituent elements may be incorporated in a single constituent element, or one constituent element may be divided into two or more constituent elements. Furthermore, a function performed by each block is to describe embodiments of the disclosure, and a detailed operation or apparatus does not limit the right scope of the disclosure.

The mobile apparatus 100 according to an embodiment of the disclosure may be implemented by various electronic apparatuses such as mobile phones, tablet PCs, digital cameras, camcorders, laptop computers, electronic book terminals, digital broadcast terminals, personal digital assistants (PDAs), portable multimedia players (PMPs), navigation devices, MP3 players, or wearable devices.

Figure 6:
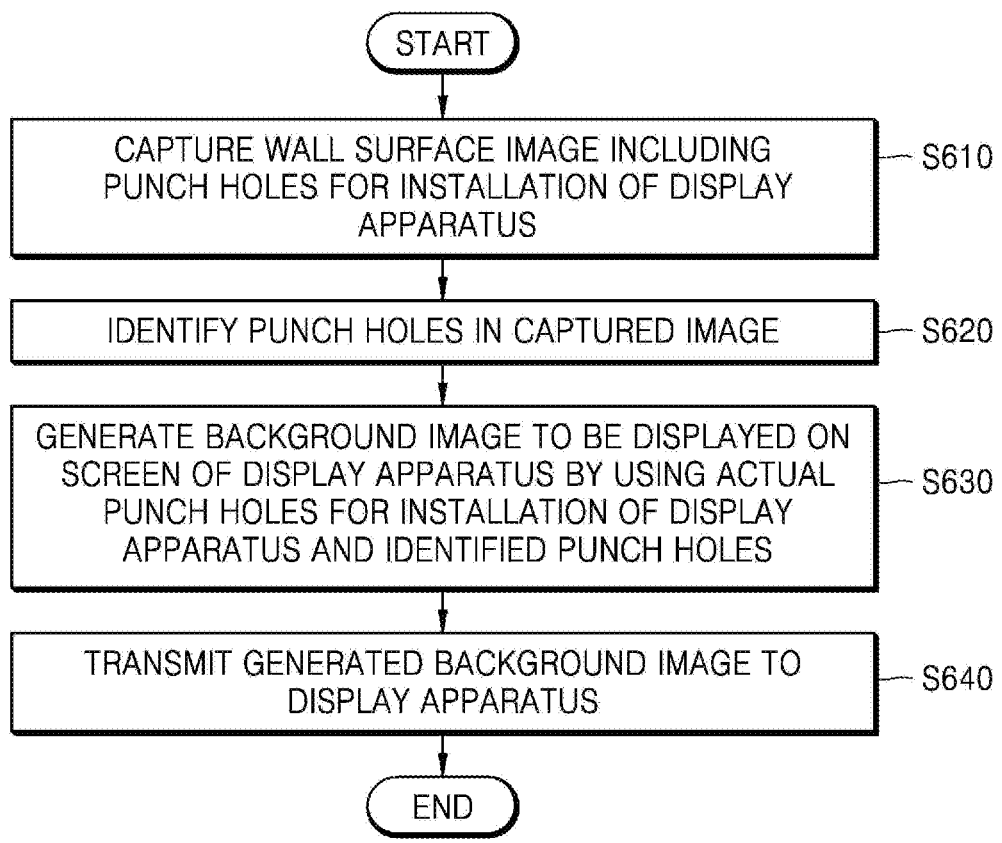
FIG. 6 illustrates a method of operating a mobile apparatus, according to an embodiment of the disclosure.

FIG. 6 illustrates a method of operating a mobile apparatus, according to an embodiment of the disclosure.

Referring to FIG. 6, in S610, the mobile apparatus 100 captures a wall surface image including punch holes for installation of a display apparatus. The punch holes may be marks of actually punched holes or positions marked for punch holes.

The mobile apparatus 100 according to an embodiment of the disclosure may display a guide image on the display 130 of the mobile apparatus 100 for capturing the wall surface image including punch holes and capture the wall surface image by using the guide image. For example, the mobile apparatus 100 may display one or more guide images on a preview image and capture the wall surface image when the guide image is placed at a punch hole position shown on the preview image.

In S620, the mobile apparatus 100 identifies a punch hole from the captured image. The mobile apparatus 100 may identify a plurality of punch holes from the captured image. Because information used for generation of a background image is an interval between the punch holes, the number of punch holes may be 2, 3, or 4, that is, two or more punch holes suffice.

The mobile apparatus 100 according to an embodiment of the disclosure may automatically identify the punch holes from the captured image by using marker recognition technology.

The mobile apparatus 100 according to an embodiment of the disclosure may receive a user's input to select a punch hole on the captured image and accordingly identify the punch hole.

In S630, the mobile apparatus 100 generates a background image to be displayed on the screen of the display apparatus 200 by using the interval between the actual punch holes for the installation of the display apparatus 200 and the interval between the punch holes identified in the captured image.

The mobile apparatus 100 according to an embodiment of the disclosure may receive information about the interval between the actual punch holes for the installation of the display apparatus 200 from a user's input, or obtain information about the interval between the actual punch holes corresponding to information about the display apparatus 200 by using the information about the display apparatus 200 received from the user's input.

The mobile apparatus 100 according to an embodiment of the disclosure may determine the size of a background image corresponding to an actual screen size of the display apparatus 200 based on a ratio between the interval between the actual punch holes and the interval between the punch holes identified in the capture image, and obtain an area corresponding to the determined size of the background image from the captured image.

In S640, the mobile apparatus 100 transmits the generated background image to the display apparatus 200.

Figure 7:
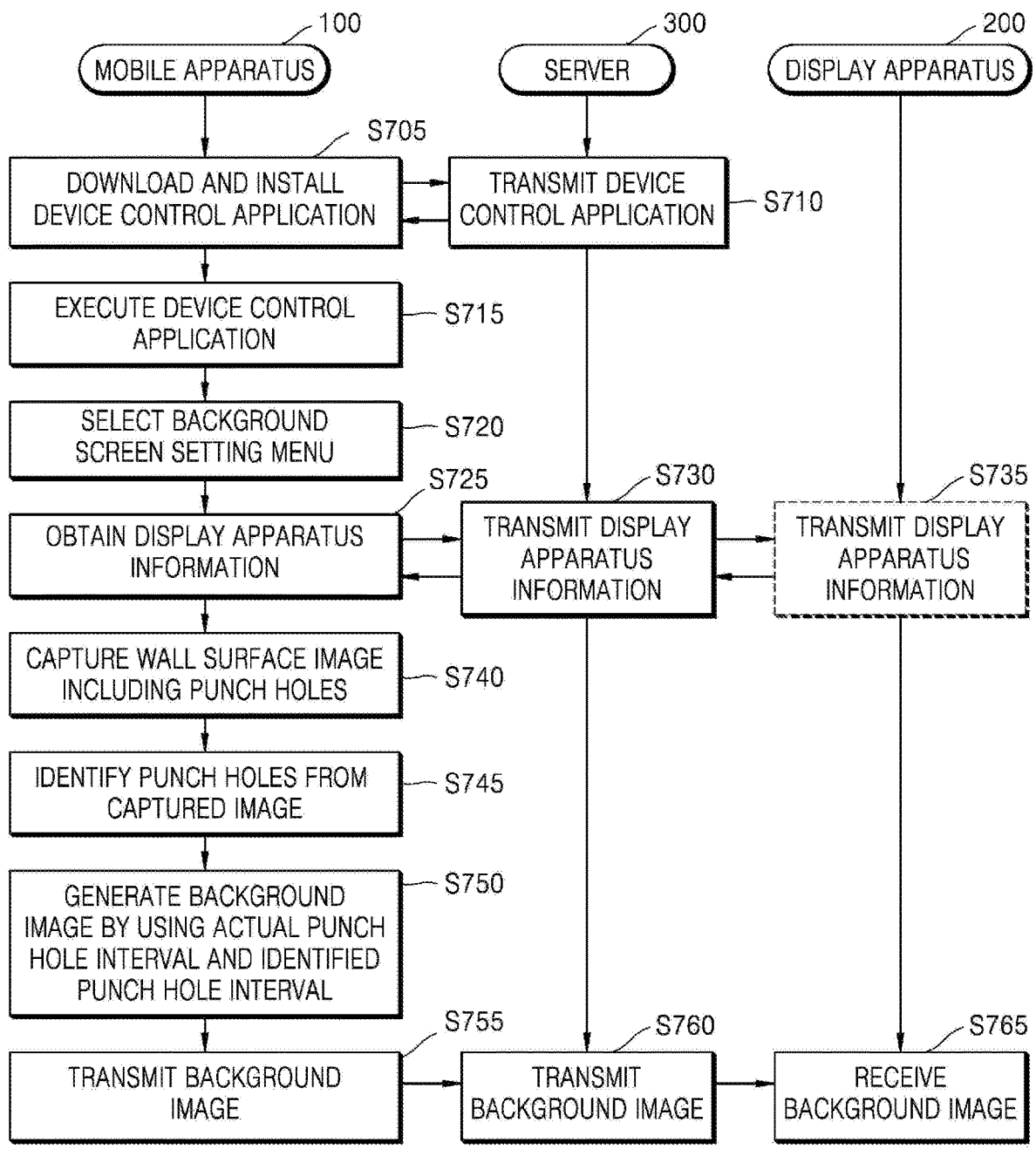
FIG. 7 is a flowchart showing operations of a mobile apparatus, a server, and a display apparatus to display a background image on a display apparatus by using an image of a wall surface on which the display apparatus is installed, according to an embodiment of the disclosure.

FIG. 7 is a flowchart showing operations of the mobile apparatus, the server, and the display apparatus to display a background image on the display apparatus by using an image of a wall surface on which the display apparatus is installed, according to an embodiment of the disclosure.

Referring to FIG. 7, in S705, the mobile apparatus 100 downloads and installs a device control application, and in S710, the server 300 transmits the device control application to the mobile apparatus 100.

When the mobile apparatus 100 requests download of a device control application from the server 300, the server 300 may transmit the device control application to the mobile apparatus 100. The mobile apparatus 100 may receive and install the device control application. The device control application, as an application used to control an external device, may include, for example, an application to control various devices in the home, such as refrigerators, display apparatuses, washing machines, or audio apparatuses.

In S715, the mobile apparatus 100 may execute the installed device control application.

In S720, the mobile apparatus 100 may receive a user's input to select a background screen setting menu.

Figure 8:
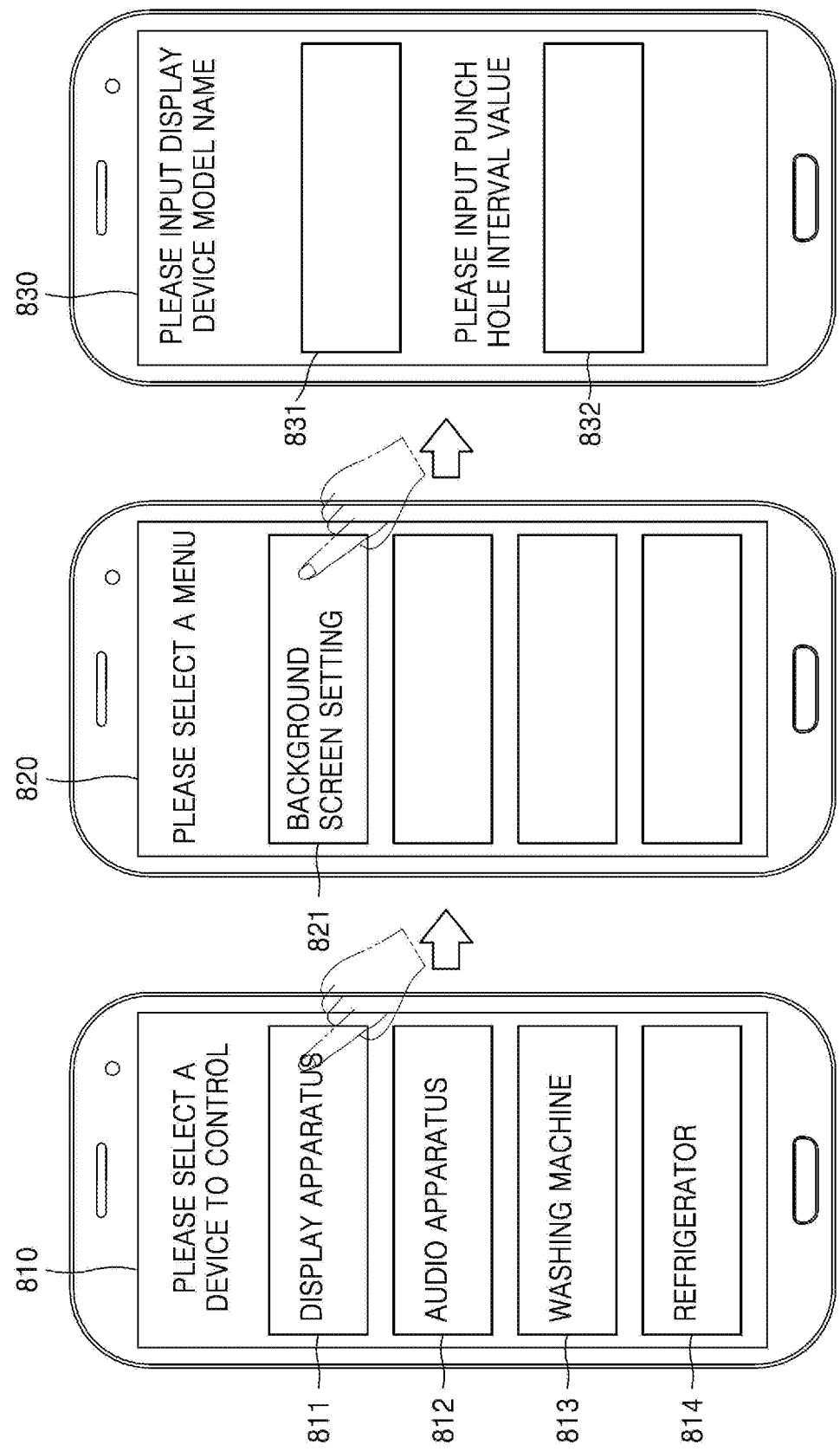
FIG. 8 illustrates a user interface provided as a mobile apparatus executes a device control application, according to an embodiment of the disclosure.

FIG. 8 illustrates a user interface provided as the mobile apparatus 100 executes a device control application, according to an embodiment of the disclosure.

Referring to FIG. 8, a first user interface 810 of a device control application executed by the mobile apparatus 100 may receive a user's input to select a device to control. The first user interface 810 may display a display apparatus 811, an audio apparatus 812, a washing machine 813, and a refrigerator 814, as devices to control, and a user may select one of the displayed devices.

When the display apparatus 811 is selected by the user, the mobile apparatus 100 may output a second user interface 820. The second user interface 820 may display menu items related to the control of the display apparatus 200, and one of the items may include a background screen setting item 821. The background screen setting item 821 is a menu item that enables a setting of displaying the same image as an image of a wall surface where the display apparatus is installed while the display apparatus 200 is not operated by a user's operation.

When the background screen setting item 821 is selected by the user, the mobile apparatus 100 may output a third user interface 830.

The mobile apparatus 100 according to an embodiment of the disclosure may receive an input of a product name of the display apparatus 200 through the third user interface 830.

For example, the third user interface 830 may include an input window 831 through which a model name of the display apparatus 200 is input. The mobile apparatus 100 may receive an input of a model name of the display apparatus 200 through the input window 831. The model name of a display apparatus is merely an example, and information for identifying a product of a display apparatus, such as a product number of a display apparatus or a manufacturer of a display apparatus, may be variously determined. The mobile apparatus 100 may transmit the input model name of the display apparatus 200 to the server 300 or the display apparatus 200 and obtain information about a display apparatus corresponding to the model name of the display apparatus 200. The information about a display apparatus may include size information regarding the screen of the display apparatus 200. The screen size information of a display apparatus may include, for example, information about a horizontal length, a vertical length, and a diagonal length of the display screen. In an example, when information about the interval between the punch holes formed in the wall surface according to the model name of the display apparatus 200 is mapped and stored in a database, the mobile apparatus 100 may obtain information about the interval between the punch holes by using the input model name. A database for the model name of a display apparatus and punch hole interval information as above may be stored in any one or more of the mobile apparatus 100, the server 300, and the display apparatus 200. Alternatively, the mapping information may include information about display apparatus size information-punch hole interval information.

The mobile apparatus 100 according to an embodiment of the disclosure may receive an input from the user, through the third user interface 830, the punch hole interval information for the installation of the display apparatus 200.

Figure 9:
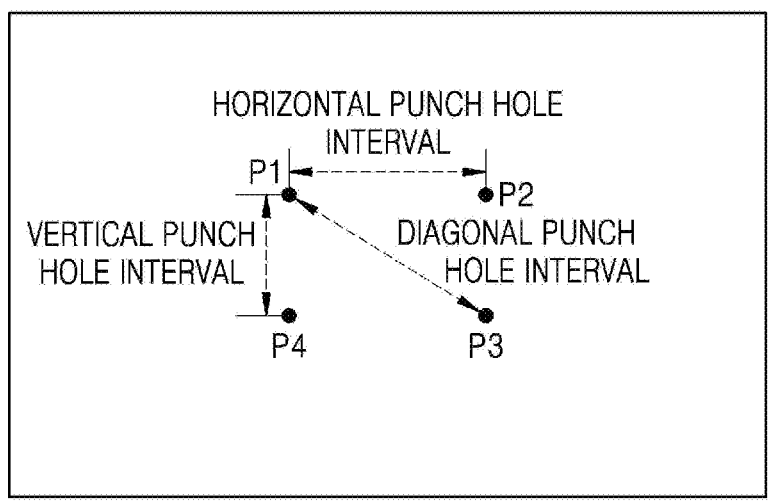
FIG. 9 is a reference view for explaining a punch hole interval value for installing a display apparatus on a wall surface.

For example, the third user interface 830 may include an input window 832 for inputting a punch hole interval value. In other words, when the user directly measures a necessary punch hole interval value and inputs the value to the mobile apparatus 100, the mobile apparatus 100 may receive an input of the punch hole interval value for the installation of the display apparatus 200 through the input window 832. Two or more punch holes may be provided to install the display apparatus 200 on a wall surface. In most cases, the punch holes for installing the display apparatus 200 on a wall surface may be four, that is, P1, P2, P3, and P4, as illustrated in FIG. 9. In this case, the punch hole interval value may include, for example, a distance between P1 and P2, that is, a horizontal punch hole interval value, a distance between P1 and P4, that is, a vertical punch hole interval value, and a distance between P1 and P3, that is, a diagonal punch hole interval value. The mobile apparatus 100 may receive an input of one or more of the horizontal punch hole interval value, the vertical punch hole interval value, and the diagonal punch hole interval value, through the third user interface 830.

According to an embodiment of the disclosure, when the input of a model name of the display apparatus 200 is received, the mobile apparatus 100 may obtain corresponding display apparatus screen size information and a punch hole interval value for installing a display apparatus model, according to previously stored mapping information.

According to an embodiment of the disclosure, when the input of display apparatus size information is received, the mobile apparatus 100 may obtain a corresponding punch hole interval value according to the previously stored mapping information.

According to an embodiment of the disclosure, when the input of a punch hole interval value for the installation of the display apparatus 200 is received, the mobile apparatus 100 may obtain corresponding display apparatus size information by using the previously stored mapping information.

Furthermore, according to an embodiment of the disclosure, the user may input, to the mobile apparatus 100, model information or product information of a display apparatus by using a QR code attached to a part of the display apparatus or to a package box of the display apparatus.

Referring back to FIG. 7, in S725, the mobile apparatus 100 may request and obtain information of the display apparatus 200. The display apparatus information may include the size of the display screen of the display apparatus 200. The size of the screen of the display apparatus 200 may be used to determine the size of an area of a background image to be used as a background screen of the display apparatus 200 in the image including a wall surface. The screen size information of a display apparatus may be included in the product information of a display apparatus, and may be obtained by using the model name of a display apparatus.

The mobile apparatus 100 may transmit the model name of a display apparatus received through the third user interface 830 to the server 300 or the display apparatus 200, and receive the screen size information of the display apparatus 200 corresponding to the model name of the display apparatus 200 from the server 300 or the display apparatus 200.

In S730, the mobile apparatus 100 according to an embodiment of the disclosure may transmit the model name of a display apparatus to the server 300 and receive, from the server 300, the screen size information of a display apparatus corresponding to the model name of a display apparatus.

In S735, according to another embodiment of the disclosure, the server 300 may transmit the model name of a display apparatus received from the mobile apparatus 100 to the display apparatus 200 and the display apparatus 200 may transmit the screen size information of a display apparatus corresponding to the model name of a display apparatus to the mobile apparatus 100 via the server 300.

According to another embodiment of the disclosure, the mobile apparatus 100 that stores the screen size information of a display apparatus corresponding to the model name of a display apparatus may obtain the screen size information of a display apparatus without a request to the server 300.

In S740, the mobile apparatus 100 may capture a wall surface image including punch holes.

The mobile apparatus 100 according to an embodiment of the disclosure may be switched to an image capturing mode to capture the wall surface image including punch holes.

The mobile apparatus 100 according to an embodiment of the disclosure may capture the wall surface image including punch holes by a user's manual input.

Figure 10:
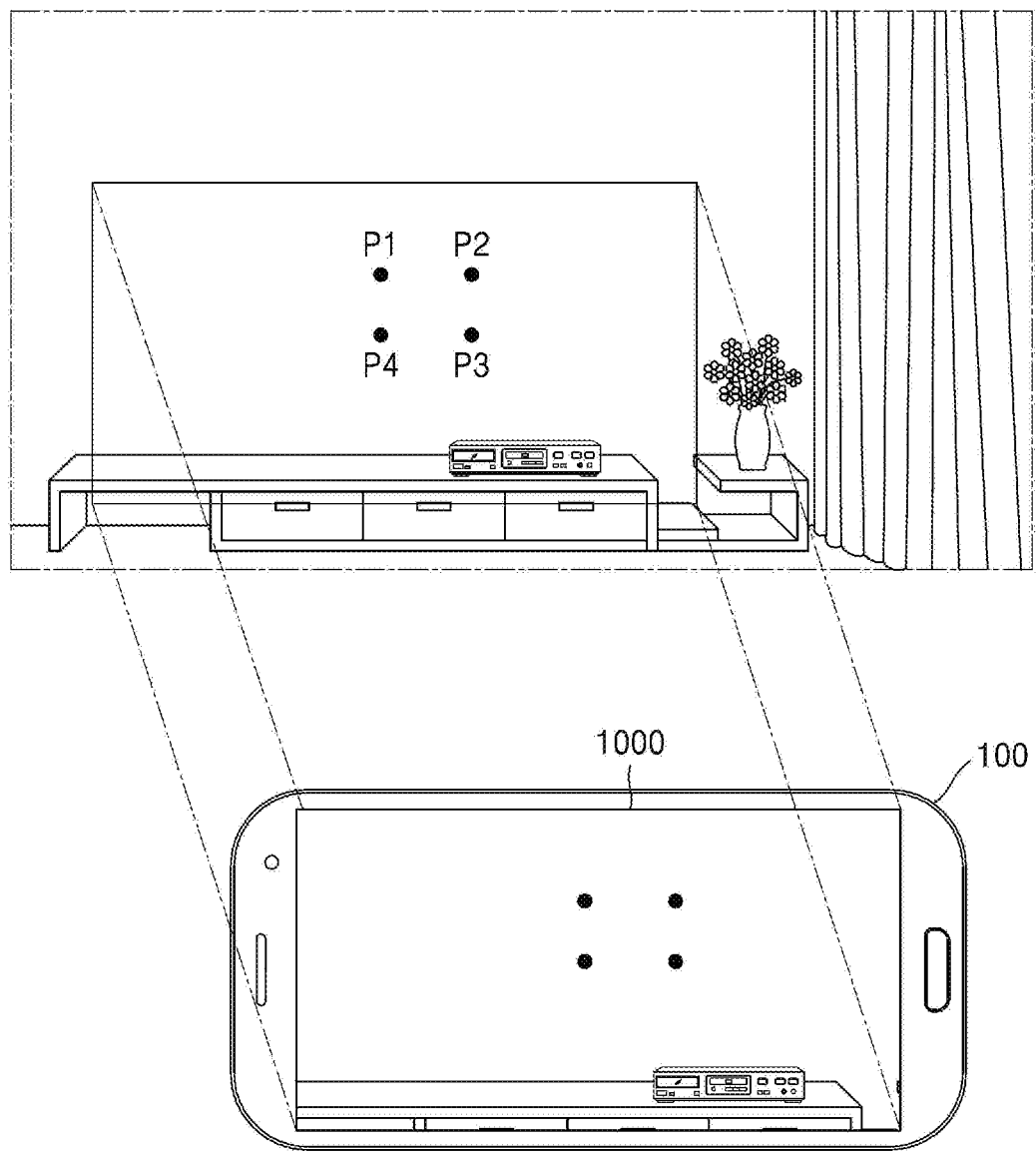
FIG. 10 illustrates an example of capturing a wall surface image according to a user's manual input, according to an embodiment of the disclosure.

FIG. 10 illustrates an example of capturing a wall surface image according to a user's manual input, according to an embodiment of the disclosure.

Referring to FIG. 10, when a user places the mobile apparatus 100 to capture an image of a wall surface where the display apparatus 200 is to be installed, the camera of the mobile apparatus 100 senses an image of a wall surface including punch holes and the display 130 of the mobile apparatus 100 may display an image of the wall surface, as a preview image 1000. When the user checks the preview image 1000 and the punch hole positions P1, P2, P3, and P4 are located inside the preview image 1000, the user manually presses an image capturing button and may obtain the wall surface image.

The mobile apparatus 100 according to an embodiment of the disclosure may display one or more guide images on the display 130 of the mobile apparatus 100 in order to capture the wall surface image including punch holes. Then, the mobile apparatus 100 may capture the wall surface image including punch holes by using the guide image. In other words, to capture a wall surface and use a captured wall surface image as a background image, a wall surface image as large as an area where the display apparatus 200 is to be installed needs to be captured. To provide the user with a guideline regarding the area to be captured, the mobile apparatus 100 may display one or more guide images on the display 130.

An example in which the mobile apparatus 100 captures an image by using a guide image is described with reference to FIGS. 11A, 11B, and 12.

FIG. 11A illustrates an example of displaying a guide image such as a punch hole shape on the mobile apparatus 100, according to an embodiment of the disclosure.

In order for the mobile apparatus 100 to capture a wall surface image and generate a background image output on the screen of the display apparatus 200, at least an image of an area that is identical to or larger than an area corresponding to the display apparatus 200 is captured from the wall surface. Accordingly, the mobile apparatus 100 may determine the position or size of a guide image such that an area identical to or larger than the area corresponding to the display apparatus 200 is captured.

Referring to FIG. 11A, of the wall surface image including the punch hole positions P1, P2, P3, and P4, an area corresponding to the size of the display apparatus 200 corresponds to an area in which (horizontal, vertical) corresponds to (W1, H1). To capture at least an area (W1, H1), the mobile apparatus 100 may capture an area larger than the area (W1, H1), for example, an area corresponding to an area (W3, H3).

Accordingly, the position or size of guide images 1, 2, 3, and 4 for capturing the area corresponding to the area (W3, H3) may be determined by using the interval between the actual punch holes. In other words, because the guide images 1, 2, 3, and 4 are generated and displayed to appropriately determine an area to be used for a background image from the wall surface image including the actual punch holes, the position or size of the guide images 1, 2, 3, and 4 may be determined by considering the positions of the actual punch holes and the interval between the punch holes.

Furthermore, the position or size of the guide images 1, 2, 3, and 4 may be determined by further considering the screen size information of a display apparatus. In other words, to generate a background image to be output to the display apparatus 200, the mobile apparatus 100 may capture an image of a wall surface area having a size sufficiently larger than an area corresponding to the screen size of the display apparatus 200 from the wall surface image including punch holes. For example, when the mobile apparatus 100 captures an area including punch holes, but the area is too small, it may be difficult to secure a background image as large as an area corresponding to the screen size of the display apparatus 200. Accordingly, the mobile apparatus 100 may determine at least one of the position and size of the guide image by further considering the screen size of the display apparatus 200.

Referring to FIG. 11A, the mobile apparatus 100 may determine the area (W3, H3) that is identical to or larger than the area corresponding to the size information of the display apparatus 200, that is, the area (W1, H1), to be an area to be captured, and determine the position or size of the guide image by considering the ratio of the size of the display apparatus 200 and the size of the punch hole interval.

FIG. 11B is a reference view for explaining an operation of capturing a wall surface image by using a guide image, according to an embodiment of the disclosure.

Referring to FIG. 11B, the mobile apparatus 100 displays, on the display 130, the guide images 1, 2, 3, and 4 having the same shape as the punch hole positions P1, P2, P3, and P4 for the installation of the display apparatus 200. When the user moves the mobile apparatus 100 to face the wall surface, the mobile apparatus 100 senses an image of a wall surface including the punch hole positions P1, P2, P3, and P4 and displays the sensed image as a preview image 1100, on the display 130. Furthermore, the mobile apparatus 100 may output a message that "Please place a guide at the punch hole position", as a help message to the user. When the user moves the mobile apparatus 100 according to the help message such that the guide images 1, 2, 3, and 4 displayed on the mobile apparatus 100 are placed on the punch hole positions P1, P2, P3, and P4 of a wall surface shown in the preview image 1100, the mobile apparatus 100 may capture the preview image 1110. In this case, the capturing of the preview image 1100 may be automatically performed as the user selects a capturing button or as the mobile apparatus 100 identifies the punch hole positions P1, P2, P3, and P4.

FIG. 12 illustrates an example of displaying a guide of a rectangular shape on the mobile apparatus 100, according to an embodiment of the disclosure.

Referring to FIG. 12, the mobile apparatus 100 displays, on the display 130, a guide image 5 having the same shape as a rectangle formed by connecting the punch hole positions P1, P2, P3, and P4 for the installation of the display apparatus 200. When the user moves the mobile apparatus 100 to face the wall surface, the mobile apparatus 100 senses an image of a wall surface including the punch hole positions P1, P2, P3, and P4 and displays the image as a preview image 1200 on the display 130. Furthermore, the mobile apparatus 100 may output a message "Please place a guide at a punch hole position" as a help message to the user. When the user moves the mobile apparatus 100 such that the guides 1, 2, 3, and 4 displayed on the mobile apparatus 100 are placed at the punch hole positions P1, P2, P3, and P4 shown on the preview image 1100 according to the help message, the mobile apparatus 100 may capture a preview image 1210. In this case, the capturing of the preview image 1110 may be automatically performed as the user selects a capturing button or as the mobile apparatus 100 identifies the punch hole positions P1, P2, P3, and P4.

The shape of the guide image illustrated in FIG. 11A, FIG. 11B, and FIG. 12 is merely an example, and any shape corresponding to the pinch hole of a wall surface that may be checked by the user may suffice.

Figure 13:
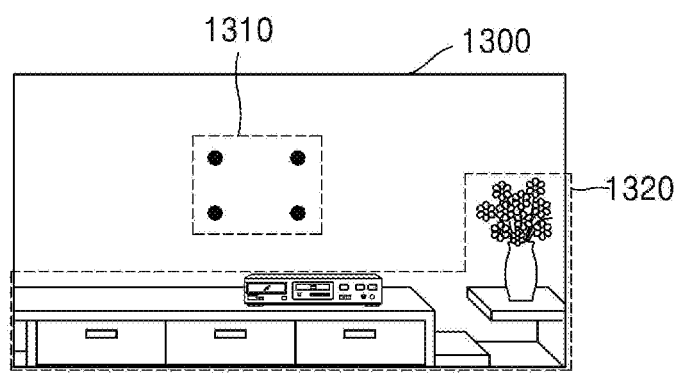
FIG. 13 illustrates an example of an image captured by a mobile apparatus.

Referring back to FIG. 7, in S740, the image captured by the mobile apparatus 100 may be illustrated in FIG. 13. A captured image 1300 may include a punch hole mark portion 1310 and an article portion 1320 arranged around the wall surface.

In S745, the mobile apparatus 100 identifies a punch hole in the captured image.

The mobile apparatus 100 according to an embodiment of the disclosure may automatically identify the punch hole positions by identifying the punch hole in the captured image as a marker by using an application using well-known marker recognition technology. The mobile apparatus 100 may store the coordinates of the punch hole positions that are automatically identified.

The mobile apparatus 100 according to an embodiment of the disclosure may display the captured image on the display screen of the mobile apparatus 100. As the user's input for selecting a punch hole on the displayed image is received, the position corresponding to the user's input may be identified as the punch hole.

Figure 14:
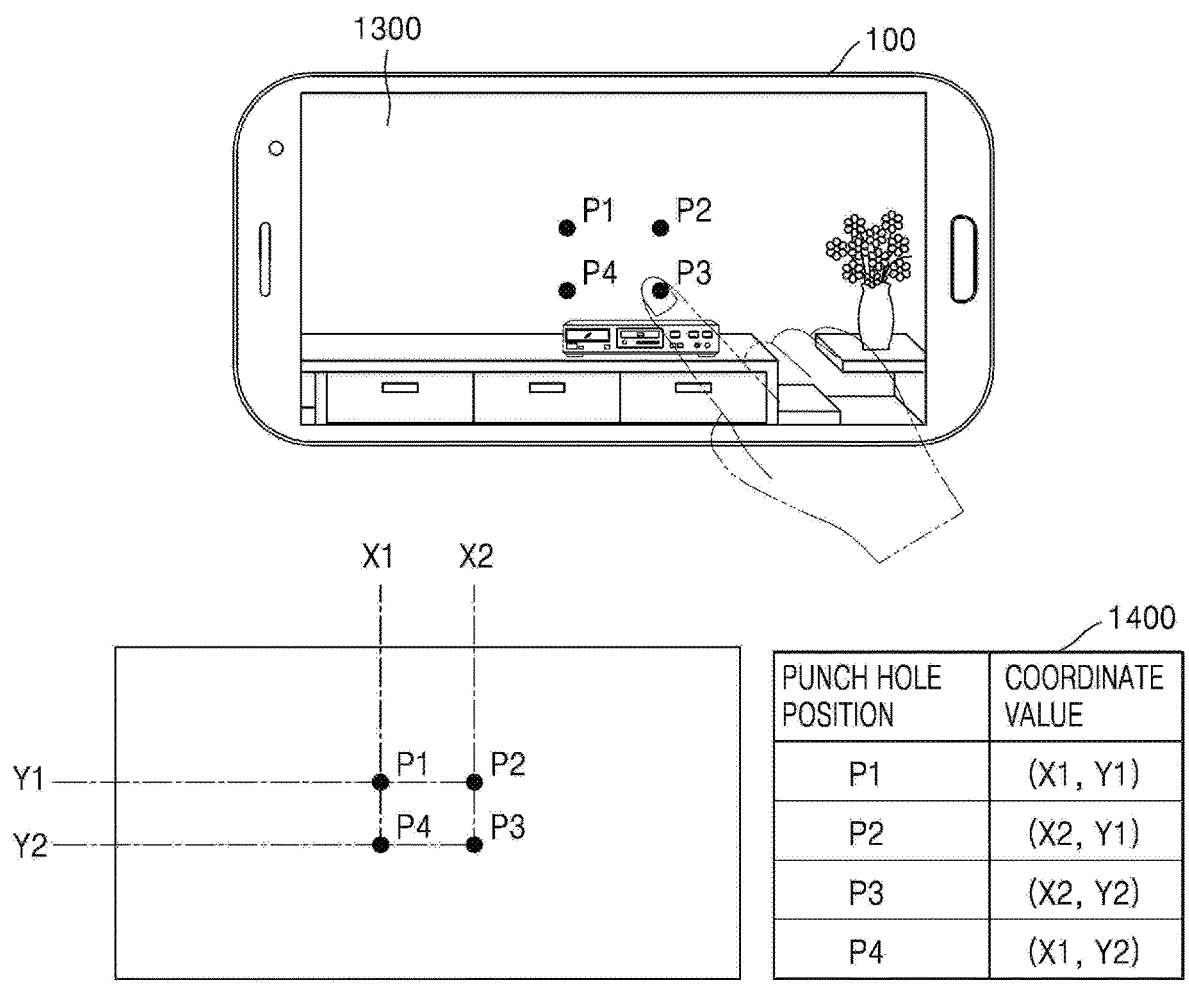
FIG. 14 is a reference view for explaining an example in which a punch hole position is manually selected by a user on an image displayed on a mobile apparatus, according to an embodiment of the disclosure.

FIG. 14 is a reference view for explaining an example in which a punch hole position is manually selected by a user on an image displayed on the mobile apparatus 100, according to an embodiment of the disclosure.

Referring to FIG. 14, the mobile apparatus 100 may display the captured image 1300 including the punch hole positions P1, P2, P3, and P4. When the user selects the punch hole P1 by touching the same using a finger on the captured image 1300 displayed on the mobile apparatus 100, the mobile apparatus 100 may store a coordinate value (X1, Y1) corresponding to the selected punch hole P1. As the punch hole positions P2, P3, and P4 are selected in the above method, the mobile apparatus 100 may store coordinate values 1400 corresponding to the punch hole positions P2, P3, and P4.

Two or more punch holes are sufficient for generation of a background image. Accordingly, even when four punch holes exist in the captured image, a background image may be generated as the mobile apparatus 100 identifies two or more punch holes. For example, the mobile apparatus 100 may identify only P1 and P2 or P1 and P3 of the punch hole positions P1, P2, P3, and P4.

Figure 15:
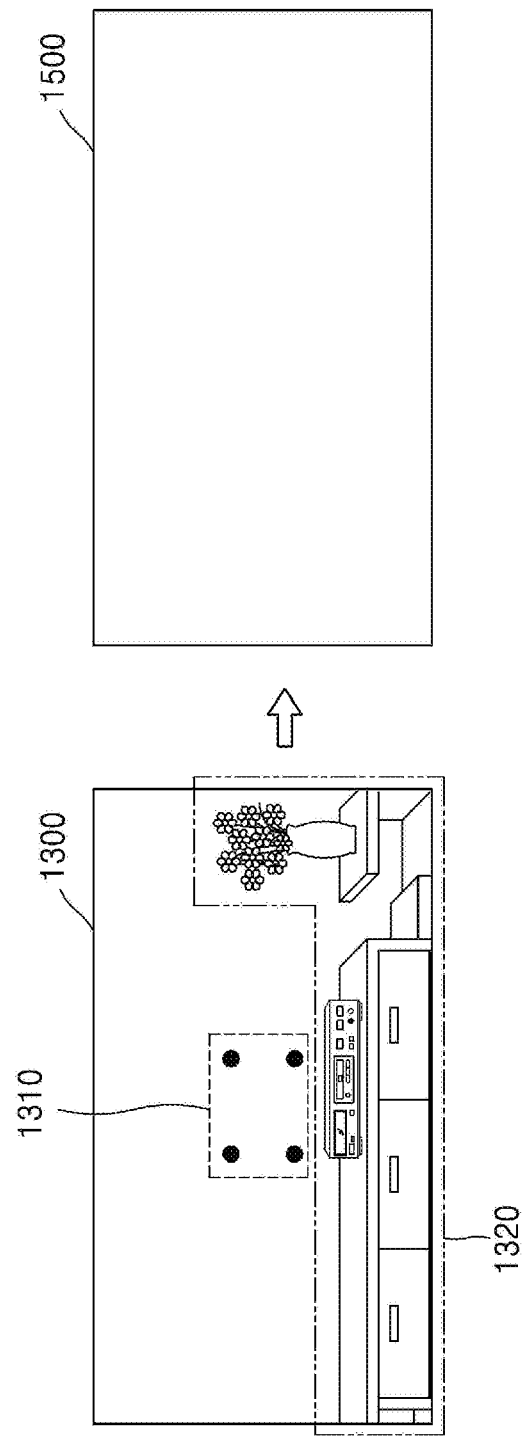
FIG. 15 illustrates an example of storing an image obtained by removing other objects other than the wall surface.

FIG. 15 illustrates an example of storing an image obtained by removing other objects other than the wall surface. The mobile apparatus 100 identifies the punch holes in the captured image and stores coordinate values corresponding to the punch holes, and removes objects other than the wall surface displayed on the captured image and stores the image. For example, referring to FIG. 15, the mobile apparatus 100 may store an image 1500 obtained by removing the punch hole mark portion 1310 and the article portion 1320 from the captured image 1300. As described above, the mobile apparatus 100 may identify and remove the punch hole mark portion 1310 and the article portion 1320 from the captured image 1300 by using automatic recognition technology, or identify and remove the punch hole mark portion 1310 and the article portion 1320 as the user selects the punch hole mark portion 1310 and the article portion 1320.

Referring back to FIG. 7, in S750, the mobile apparatus 100 generates a background image by using the interval between the actual punch holes and the interval between the identified punch holes.

FIG. 16 illustrates an example of an image having tilt distortion. The mobile apparatus 100 may correct tilt distortion when the tilt distortion exists in the captured image. For example, as illustrated in FIG. 16, when a wall surface has a certain pattern 1600, and the user captures an image with the mobile apparatus 100 being slightly tilted, the mobile apparatus 100 captures an image 1610 having tilt distortion.

FIG. 17 illustrates an example of correcting an image having a tilt distortion, according to an embodiment of the disclosure.

Referring to FIG. 17, it may be seen from the captured image 1700 that a wall sheet with a vertical stripe pattern is slightly tilted. Accordingly, the punch hole positions P1, P2, P3, and P4 tilts as much as the wall sheet with a vertical stripe pattern tilts. Accordingly, while the original X coordinates of the punch hole positions P2 and P3 should be identical, as the punch hole P3 tilts, a line connecting P2-P3 tilts by an angle 81 with respect to the vertical line. Alternatively, while the Y coordinates of the punch hole positions P1 and P2 should be identical, as the punch pole position P2 tilts, a line connecting P1-P2 tilts an angle 82 with respect to the horizontal line. Accordingly, by rotating the image by the above degree of tilt, that is, a tilt angle, an image 1710 in which the tilt distortion is corrected may be obtained. Although FIG. 17 illustrates the horizontal tilt or the vertical tile, a degree of distortion in an image may be determined in various methods. For example, a tile may be determined by using the punch holes that are diagonally arranged.

Next, the mobile apparatus 100, by using an image in which the tilt distortion is corrected, may generate a background image by using the interval between the punch holes identified in the captured image and the interval between the actual punch holes.

FIG. 18 is a reference view for explaining an example of generating a background image by using a punch hole position identified from a captured image and an actual punch hole position, according to an embodiment of the disclosure.

Referring back to FIG. 7, when the mobile apparatus 100 obtains display apparatus information in S725, the mobile apparatus 100 may obtain a horizontal length W1, a vertical length H1, and a diagonal length of the display apparatus 200. Furthermore, the mobile apparatus 100 may obtain information about the punch hole interval based on the user's input or the product information of a display apparatus. The information about the punch hole interval may include, for example, a punch hole interval dl between the punch hole P1 and the punch hole P2. Alternatively, in another embodiment of the disclosure, instead of the information about the punch hole interval, position information (a1, b1) for the punch hole P1 may be used. The information about the punch hole interval may include position information about other punch hole interval or other punch hole.

Furthermore, in S745, the mobile apparatus 100 stores information about coordinates of the punch hole positions P1, P2, P3, and P4 identified in the captured image.

Accordingly, the mobile apparatus 100 may determine and obtain an area used as a background image in the captured image by using the information about the interval between the punch hole positions P1, P2, P3, and P4 identified in the captured image and the information about the interval between the actual punch holes. In detail, the mobile apparatus 100 may determine the horizontal length W2 of the background image of the horizontal length W1 of the display apparatus 200 and the vertical length H2 of the background image corresponding to the vertical length H1 of the display apparatus 200 by using the ratio between the punch hole interval dl between the actual punch holes and a punch hole interval d2 identified in the captured image 1500.

Furthermore, a position (a2, b2) of the identified punch hole R1 may be determined by using position information (a1, b1) of the actual punch hole P1. A crop area 1800 to be extracted from the captured image 1500 may be determined according to the determination of a2 and b2. Accordingly, the background image may be generated by obtaining an image 1810 as large as the crop area 1800 from the captured image 1500.

Figure 19:
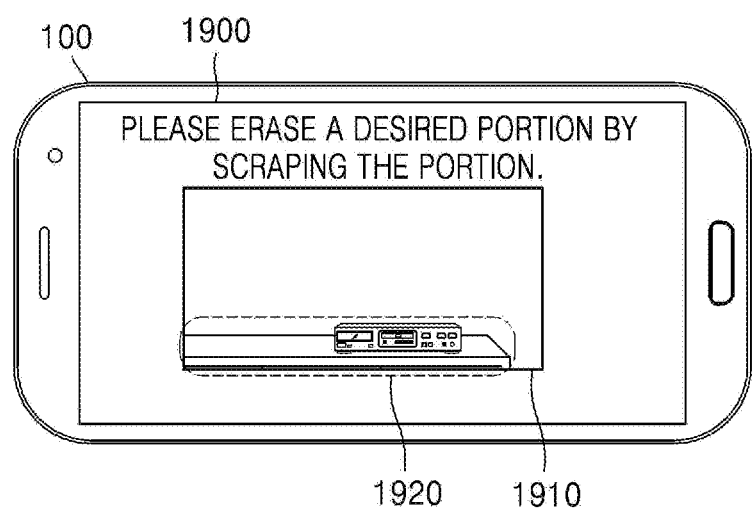
FIG. 19 illustrates an example of a user interface used to erase a desired portion from a generated background image, according to an embodiment of the disclosure.

FIG. 19 illustrates an example of a user interface 1900 to erase a desired portion from the background image generated according to an embodiment of the disclosure.

Referring to FIG. 19, the mobile apparatus 100 may display the generated background image. For example, the background image 1910 displayed in the mobile apparatus 100 may include an image portion 1920 of other installations included in the image obtained during capturing of the wall surface image. The user may remove the image portion 1920 from the background image 1910 by touching or scraping the image portion 1920. The removing of a partial pattern displayed on an image by using a finger or a tool may be performed by using well-known drawing editing techniques.

Referring back to FIG. 7, in S755, the mobile apparatus 100 may transmit the generated background image to the display apparatus 200.

The mobile apparatus 100 according to an embodiment of the disclosure may directly transmit the generated background image to the display apparatus 200.

The mobile apparatus 100 according to an embodiment of the disclosure may transmit the generated background image to the display apparatus 200 via the server 300. In S760, the server 300 may transmit the background image to the display apparatus 200, and in S765, the display apparatus 200 may receive the background image and display the received background image on the display screen.

After the display apparatus 200 according to an embodiment of the disclosure receives and displays the background image, the user may change the color tone or brightness of the background image displayed on the display apparatus 200. For example, the color tone of the background image displayed on the display apparatus 200 may be different from the color tone of the actual wall surface. Accordingly, in this case, the mobile apparatus 100 may further provide a user interface to enable the user to change the color tone or brightness of the background image.

FIG. 20 illustrates an example in which a user checks a background image displayed on the display apparatus 200 and changes the color of the background image through the mobile apparatus 100, according to an embodiment of the disclosure.

Referring to FIG. 20, the display apparatus 200 may display a background image 2000 received from the mobile apparatus 100. The mobile apparatus 100 may provide a user interface 2010 to change the color of the background image. When the user adjusts the color of the background image through the user interface 2010, the mobile apparatus 100 may transmit the color adjusted background image to the display apparatus 200.

As described above, according to the above-described embodiments of the disclosure, because the background image to be displayed on the display apparatus is obtained more naturally by capturing an image of a wall surface where a display apparatus is to be installed by using punch hole positions for installation of the display apparatus and generating a background image to be displayed on the display apparatus by using the captured background image, the aesthetics of an environment where the display apparatus is installed may be improved.

The operation methods of the mobile apparatus, the display apparatus, and the server according to an embodiment of the disclosure may be embodied in form of a program command executable through various computing devices, and may be recorded on a computer-readable medium. The computer-readable medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes created by a compiler, but also high-level programming language executable by a computer using an interpreter.

It should be understood that embodiments of the disclosure described herein should be considered in a descriptive sense only and not for purposes of limitation. Descriptions of features or aspects within each embodiment of the disclosure should typically be considered as available for other similar features or aspects in other embodiments of the disclosure.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic apparatus comprising:
a camera;
a display;
a communication interface;
a memory to store one or more instructions; and
a processor configured to execute the one or more instructions to:
identify a plurality of punch holes for installation of a display apparatus from a captured image from the camera,
provide a background image to be displayed on a screen of the display apparatus from the captured image by using an interval between actual punch holes for the installation of the display apparatus and an interval between the punch holes identified from the captured image, and
control the communication interface to transmit the provided background image to the display apparatus.

2. The electronic apparatus of claim 1, wherein the processor is further configured to execute the one or more instructions to provide the background image to be displayed on the screen of the display apparatus from the captured image by further using size information of the display apparatus obtained through the communication interface.

3. The electronic apparatus of claim 2, wherein the processor is further configured to execute the one or more instructions to obtain information about the interval between the actual punch holes from a user, and identify a size of the display apparatus based on the obtained information about the interval between the actual punch holes.

4. The electronic apparatus of claim 3, wherein the memory stores mapping information obtained by mapping the information about the interval between the actual punch holes and the size information of the display apparatus, and
wherein the processor is further configured to execute the one or more instructions to identify a size of the display apparatus corresponding to the information about the interval between the actual punch holes, to be the size of the display apparatus, by using the mapping information.

5. The electronic apparatus of claim 1, wherein the processor is further configured to execute the one or more instructions to:
control the display to display a guide image to identify an image, from which the background image is extracted, from the captured image obtained from the camera, and
identify an image, in which the identified punch holes correspond to the guide image, from the captured image obtained from the camera to be the image from which the background image is extracted.

6. The electronic apparatus of claim 5, wherein the processor is further configured to execute the one or more instructions to identify at least one of a position or a size of the guide image by using the interval between the actual punch holes.

7. The electronic apparatus of claim 6, wherein the processor is further configured to execute the one or more instructions to identify the at least one of the position or the size of the guide image by further considering the size of the display apparatus.

8. The electronic apparatus of claim 1, wherein the processor is further configured to execute the one or more instructions to identify the plurality of punch holes from the captured image by automatically detecting the punch holes from the captured image or by displaying the captured image on the display and obtaining a user's input to select the punch holes from the captured image displayed on the display.

9. The electronic apparatus of claim 1, wherein the processor is further configured to execute the one or more instructions to obtain information about the interval between the actual punch holes by using a user's input or product information of the display apparatus.

10. The electronic apparatus of claim 1, wherein the processor is further configured to execute the one or more instructions to:
obtain information about an actual screen size of the display apparatus, identify a size of the background image corresponding to the actual screen size of the display apparatus based on a ratio between the interval between the actual punch holes and the interval between the identified punch holes, and
provide the background image by obtaining an area corresponding to the identified size of the background image from the captured image.

11. The electronic apparatus of claim 1, wherein the processor is further configured to execute the one or more instructions to correct tilt distortion of the captured image by using coordinate values of the identified plurality of punch holes.

12. The electronic apparatus of claim 1, wherein the processor is further configured to execute the one or more instructions to remove a punch hole mark from the background image provided from the captured image.

13. The electronic apparatus of claim 1, wherein the processor is further configured to execute the one or more instructions to transmit the provided background image directly to the display apparatus, or to the display apparatus via a server.

14. A method of operating an electronic apparatus, the method comprising:
identifying a plurality of punch holes for installation of a display apparatus from a captured image obtained from a camera;
providing a background image to be displayed on a screen of the display apparatus from the captured image by using an interval between actual punch holes for the installation of the display apparatus and an interval between the punch holes identified from the captured image; and
controlling a communication interface to transmit the provided background image to the display apparatus.

15. The method of claim 14, wherein the background image to be displayed on the screen of the display apparatus is provided by further using size information of the display apparatus obtained through the communication interface of the electronic apparatus.

16. The method of claim 15, further comprising:
obtaining, from a user, information about the interval between the actual punch holes; and
identifying a size of the display apparatus based on the obtained information about the interval between the actual punch holes.

17. The method of claim 16, further comprising:
storing mapping information obtained by mapping the information about the interval between the actual punch holes and the size information of the display apparatus; and
identifying the size of the display apparatus corresponding to the information about the interval between the actual punch holes, to be the size of the display apparatus, by using the mapping information.

18. The method of claim 14, further comprising:
controlling a display of the electronic apparatus to display a guide image to identify an image, from which the background image is extracted, from the captured image obtained from the camera; and
identifying an image, in which the identified punch holes correspond to the guide image, of the captured image obtained from the camera to be the image from which the background image is extracted.

19. The method of claim 14, further comprising:
obtaining information about an actual screen size of the display apparatus; and
identifying a size of the background image corresponding to the actual screen size of the display apparatus based on a ratio between the interval between the actual punch holes and the interval between the identified punch holes, and providing the background image by obtaining an area corresponding to the identified size of the background image from the captured image.

20. A non-transitory computer readable storage medium having stored thereon a program, which when executed by a computer, performs the method of claim 14.

* * * * *